United States Patent
Polyakov et al.

(10) Patent No.: US 11,861,755 B2
(45) Date of Patent: Jan. 2, 2024

(54) CUSTOMER SIGNALING LOCATION BEACON

(71) Applicant: DoorDash, Inc., San Francisco, CA (US)

(72) Inventors: Ilya Polyakov, San Francisco, CA (US); Albert Poon, San Francisco, CA (US); Rajat Shroff, Redwood Shores, CA (US)

(73) Assignee: DoorDash, Inc.

( * ) Notice: Subject to any disclaimer, the term of this patent is extended or adjusted under 35 U.S.C. 154(b) by 0 days.

(21) Appl. No.: 17/734,793

(22) Filed: May 2, 2022

(65) Prior Publication Data

US 2022/0351321 A1 Nov. 3, 2022

Related U.S. Application Data

(60) Provisional application No. 63/182,478, filed on Apr. 30, 2021.

(51) Int. Cl.
| | |
|---|---|
| *G06Q 50/32* | (2012.01) |
| *H04W 4/021* | (2018.01) |
| *H04W 4/02* | (2018.01) |
| *G06Q 10/083* | (2023.01) |
| *G06Q 10/087* | (2023.01) |
| *G06Q 50/30* | (2012.01) |

(52) U.S. Cl.
CPC .......... *G06Q 50/32* (2013.01); *G06Q 10/083* (2013.01); *G06Q 10/087* (2013.01); *G06Q 50/30* (2013.01); *H04W 4/021* (2013.01); *H04W 4/026* (2013.01)

(58) Field of Classification Search
CPC .... G06Q 50/32; G06Q 10/083; G06Q 10/087; G06Q 50/30; H04W 4/021; H04W 4/026
USPC ......................................................... 705/330
See application file for complete search history.

(56) References Cited

U.S. PATENT DOCUMENTS

| | | | |
|---|---|---|---|
| 8,423,431 B1 * | 4/2013 | Rouaix | G06Q 10/087 |
| | | | 705/28 |
| 9,538,332 B1 * | 1/2017 | Mendelson | H04W 48/10 |
| 2011/0106583 A1 * | 5/2011 | Rozell | G06Q 10/02 |
| | | | 705/7.29 |
| 2016/0292635 A1 * | 10/2016 | Todasco | H04W 4/023 |

(Continued)

OTHER PUBLICATIONS

"Distributed Localization Using a Moving Beacon in Wireless Sensor Networks" Published by IEEE (Year: 2008).*

(Continued)

*Primary Examiner* — Zeina Elchanti
(74) *Attorney, Agent, or Firm* — Kilpatrick Townsend & Stockton LLP

(57) ABSTRACT

Systems, methods, and computer-readable media for providing a signaling location beacon are provided. Specifically, a physical location for transferring a delivery from a delivery person to a customer can be determined. Also, a physical beacon associated with the physical location can be identified. Further, an interaction between the physical beacon and the delivery person can be detected. For example, the interaction can occur based on the physical beacon and the delivery person being in physical proximity to each other. As follows, in response to the interaction, transmission of a sensory signal to the delivery person can be facilitated to provide perceivable direction information associated with the physical location to the delivery person.

17 Claims, 17 Drawing Sheets

(56) References Cited

U.S. PATENT DOCUMENTS

2016/0314518 A1* 10/2016 Goodwin ........... G06Q 30/0641
2018/0109908 A1*  4/2018 Swanson ............... G06Q 50/28
2019/0310655 A1* 10/2019 Voorhies ............... G06Q 50/28
2020/0361497 A1* 11/2020 Hoppe ................. H04W 4/023

OTHER PUBLICATIONS

Non-Final Office Action, dated Mar. 30, 2023, for U.S. Appl. No. 17/734,815 (55 pages).
Notice of Allowance, dated Sep. 13, 2023, in U.S. Appl. No. 17/734,815, 14 pages.
Mens, "How to Make Your Outdoor Landscape Lighting Smart", Lazyadmin, Oct. 1, 2020, pp. 1-11.

* cited by examiner

CUSTOMER SIGNALING LOCATION BEACON

CROSS-REFERENCE TO RELATED APPLICATIONS

This application claims priority to U.S. provisional application No. 63/182,478 filed on Apr. 30, 2021 which is expressly incorporated by reference herein in its entirety.

TECHNICAL FIELD

The subject technology provides solutions for internet of things (IoT) devices, and in particular, for providing a signaling location beacon.

BACKGROUND

At night, when a deliverer of goods attempts to deliver food, for example, a large amount of time is lost due to the deliverer being unable to find the point of delivery (e.g., a residence). In this example, this occurs because residence numbers (e.g., at the beginning of an address) are not always displayed prominently or visible due to a lack of proper lighting. Delivery data shows a clear increase in time between the deliverer entering a customer geofence and completing the delivery, after sunset. This increase in time delay also corresponds with sundown throughout every season and daylight savings. Some delivery locations are hard to find even during the day as the residence numbers are not readily visible to the deliverer.

Further, it is often difficult for a delivery person to quickly and efficiently collect an item for delivery. In particular, when a specific item is at a location with various other items, e.g. items for collection and delivery, it can be difficult for a delivery person to find the specific item at the location. In turn, this can further cause time delays in delivering items.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1A:
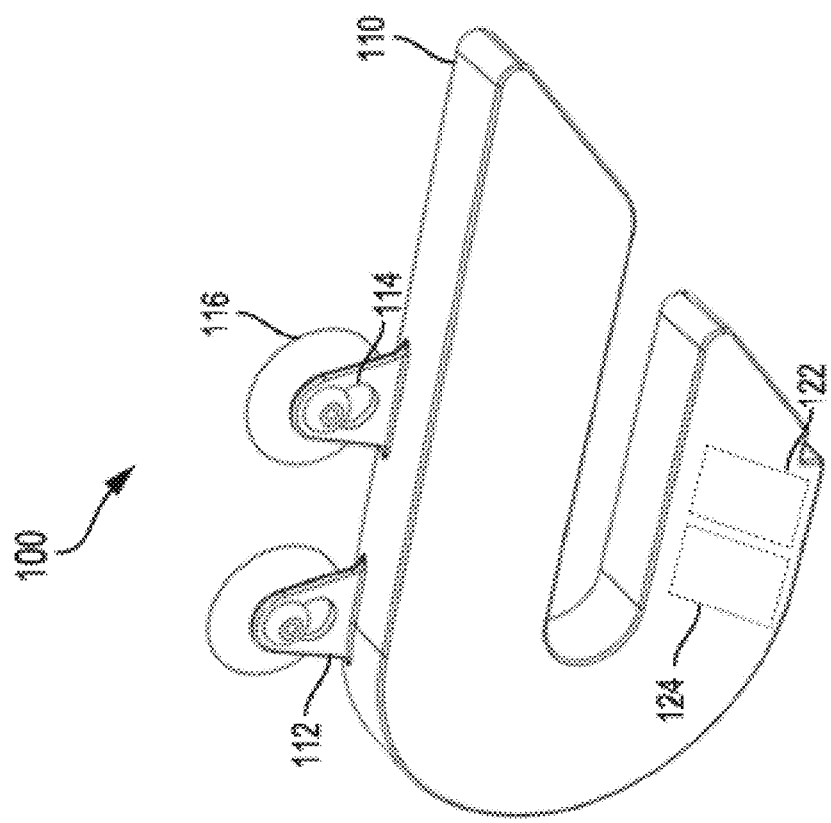
FIGS. 1A and 1B illustrate perspective views of an example location beacon, according to some aspects of the disclosed technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

According to at least one example of the present technology, a location beacon system can determine a physical location for transferring a delivery from a delivery person to a customer. Further, the location beacon system can identify a physical beacon associated with the physical location. Also, the location beacon system can detect an interaction between the physical beacon and the delivery person. In some examples, the interaction occurs based on the physical beacon and the delivery person being in physical proximity to each other. As follows, the location beacon system can facilitate transmission of a sensory signal to the delivery person in response to the interaction to provide perceivable direction information associated with the physical location to the delivery person.

A system can include one or more processors and at least one computer-readable storage medium storing instructions which, when executed by the one or more processors, cause the one or more processors to determine a physical location for transferring a delivery from a delivery person to a customer. The instructions can also cause the one or more processors to identify a physical beacon associated with the physical location. Also, the instructions can cause the one or more processors to detect an interaction between the physical beacon and the delivery person. In some examples, the interaction can occur based on the physical beacon and the delivery person being in physical proximity to each other. As follows, the instructions can cause the one or more processors to facilitate transmission of a sensory signal to the delivery person in response to the interaction to provide perceivable direction information associated with the physical location to the delivery person.

A non-transitory computer-readable storage medium having stored therein instructions which, when executed by one or more processors, cause the one or more processors to determine a physical location for transferring a delivery from a delivery person to a customer. The instructions can also cause the one or more processors to identify a physical beacon associated with the physical location. Also, the instructions can cause the one or more processors to detect an interaction between the physical beacon and the delivery person. In some examples, the interaction can occur based on the physical beacon and the delivery person being in physical proximity to each other. As follows, the instructions can cause the one or more processors to facilitate transmission of a sensory signal to the delivery person in response to the interaction to provide perceivable direction information associated with the physical location to the delivery person.

According to another example of the present technology, a location beacon system can determine a collection location for collecting, by an agent, an item. Further, the location beacon system can identify a physical beacon associated with the collection location. Also, the location beacon system can detect an interaction between the physical beacon and the agent. In some examples, the interaction can occur based on the physical beacon and the agent being in physical proximity to each other during a process of the agent collecting the item at the collection location. As follows, the location beacon system can facilitate transmission of a sensory signal to the agent in response to the interaction to provide perceivable direction information associated with the collection location of the item to the agent. The sensory signal can be specific to the agent based on the interaction between the physical beacon and the agent.

A system can include one or more processors and at least one computer-readable storage medium storing instructions which, when executed by the one or more processors, cause the one or more processors to determine a collection location for collection, by an agent, an item. The instructions can also cause the one or more processors to identify a physical beacon associated with the collection location. Also, the instructions can cause the one or more processors to detect an interaction between the physical beacon and the agent. In some examples, the interaction can occur based on the physical beacon and the agent being in physical proximity to each other during a process of the agent collecting the item at the collection location. As follows, the instructions can cause the one or more processors to facilitate transmission of a sensory signal to the agent in response to the interaction to provide perceivable direction information associated with the collection location of the item to the agent. The sensory signal can be specific to the agent based on the interaction between the physical beacon and the agent.

A non-transitory computer-readable storage medium having stored therein instructions which, when executed by one or more processors, cause the one or more processors to determine a collection location for collection, by an agent, an item. The instructions can also cause the one or more processors to identify a physical beacon associated with the collection location. Also, the instructions can cause the one or more processors to detect an interaction between the physical beacon and the agent based on the physical beacon and the agent being in physical proximity to teach other during a process of the agent collecting the item at the collection location. In some examples, the interaction can occur based on the physical beacon and the agent being in physical proximity to each other during a process of the agent collecting the item at the collection location. As follows, the instructions can cause the one or more processors to facilitate transmission of a sensory signal to the agent in response to the interaction to provide perceivable direction information associated with the collection location of the item to the agent. The sensory signal can be specific to the agent based on the interaction between the physical beacon and the agent.

Description

As previously described, a large amount of time can be lost due to a deliverer being unable to find a point of delivery (e.g., a residence). This can occur because residence numbers (e.g., at the beginning of an address) are not always displayed prominently or visible, e.g. due to a lack of proper lighting. Delivery data shows a clear increase in time between the deliverer entering a customer geofence and completing the delivery, after sunset. This increase in time delay also corresponds with sundown throughout every season and daylight savings. Some delivery locations are hard to find even during the day as the residence numbers are not readily visible to the deliverer.

Further, it is often difficult for a delivery person to quickly and efficiently collect an item for delivery. In particular, when a specific item is at a location with various other items, e.g. items for collection and delivery, it can be difficult for a delivery person to find the specific item at the location. In turn, this can further cause time delays in delivering items.

Therefore, there exists a need for systems that facilitate more efficient collection and/or delivery of items by a delivery person. In particular, there exists a need for beacon devices that can facilitate more efficient collection of items from a merchant and/or more efficient delivery of items to a customer.

The present technology includes systems, methods, and computer-readable media for solving these problems and discrepancies. Specifically, the present technology involves system, methods, and computer-readable media for using an interaction between a physical beacon and a delivery person to facilitate a delivery by a delivery person to a customer. Additionally, the present technology involves systems, methods, and computer-readable media for using an interaction between a physical beacon and a delivery person to facilitate collection of an item for delivery.

Figure 1B:
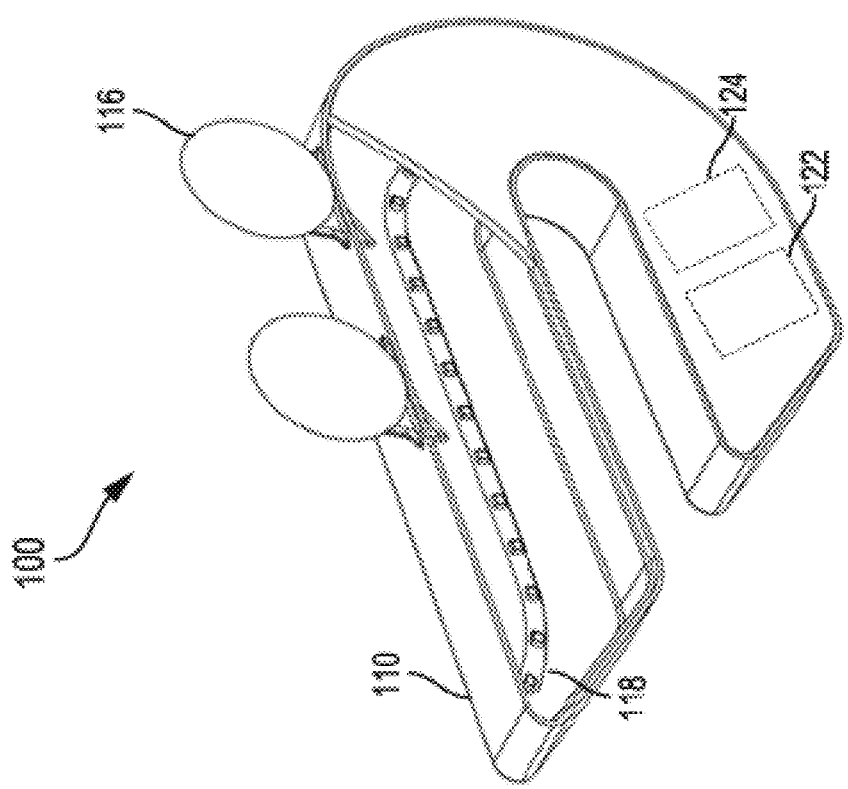

FIGS. 1A and 1B illustrate perspective views of an example location beacon 100, according to some aspects of the disclosed technology. In some implementations, the location beacon 100 can include a housing 110, attachment extensions 112, apertures 114, suction cups 116, a light emitting diode (LED) strip 118, a transceiver 122, and a processor 124. The location beacon 100 (e.g., an internet connected lighting appliance) can be installed at a customer destination. For example, the location beacon 100 can be installed on a window, door, front yard, or anywhere location readily perceivable from a street or by a driver in a car who may be driving by. When the deliverer crosses a customer geofence (e.g., Cx geofence 158 of FIG. 10), i.e., approaches a delivery destination, the location beacon 100 can be triggered by a platform server 144 of FIG. 7 to illuminate and indicate its location to the deliverer. It is noted that while visual signals are used in examples described herein, any applicable forms of signals (e.g., visual, audible, etc.) that can be perceived by a human can be used to provide direction information.

In some implementations, the location beacon 100 can be enclosed in a weatherproof housing 110 (e.g., a weatherproof case) having one or more external facing surfaces of the location beacon 100. The housing 110 of the location beacon 100 can also include an opaque light diffusing window to sufficiently provide enough illumination to attract the attention of the deliverer. In some examples, the other surfaces of the location beacon 100 can also be opaque to signal the customer as well as the deliverer. The housing 110 of the location beacon 100 can be made of plastic, Polyethylene Terephthalate, High-Density Polyethylene, Polyvinyl Chloride, Low-Density Polyethylene, or any other material suitable for the intended purpose and understood by a person of ordinary skill in the art.

Figure 3:
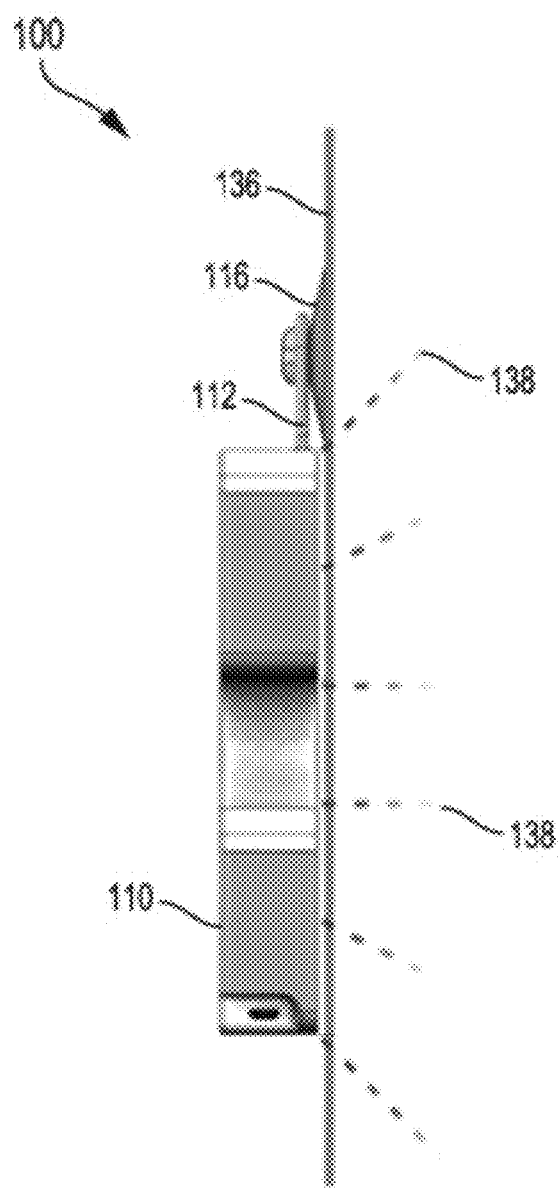
FIG. 3 illustrates a side view of an example location beacon attached to a surface, according to some aspects of the disclosed technology.
Figure 6:
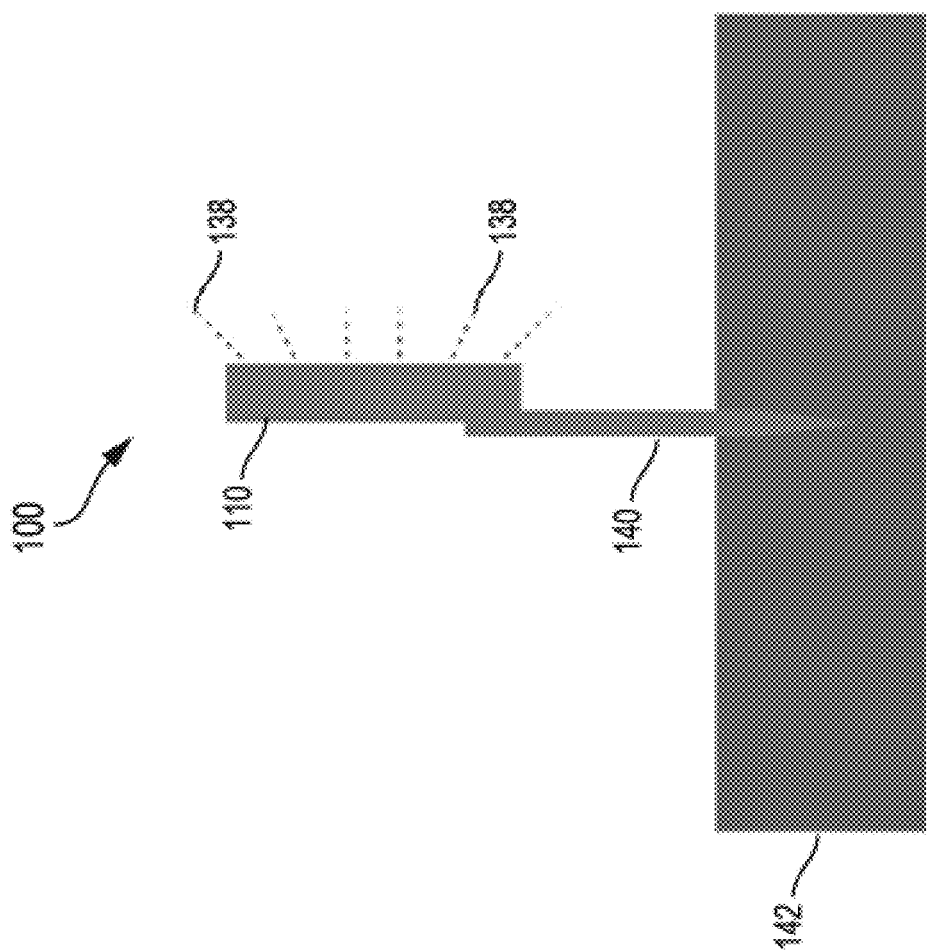
FIG. 6 illustrates an example location beacon along with a stake, according to some aspects of the disclosed technology.

In other implementations, the attachment extensions 112 can include apertures 114 that can be configured to receive the suction cups 116. In some aspects, the location beacon 100 can support multiple mounting methods, indoors or outdoors, such that the location beacon 100 can be positioned on a window 136 as shown in FIG. 3 (e.g., by utilizing the suction cups 116), front yard 142 as shown in FIG. 6 (e.g., by utilizing a stake 140 of FIG. 6), door, or any other location suitable for the intended purpose of being seen from the street or from a car that may be moving. While FIGS. 1A and 1B illustrate the location beacon 100 as having two sets of attachment extensions 112 and suction cups 116, other combinations and variations are contemplated in this disclosure. For example, a larger sized location beacon 100 can include more sets of attachment extensions 112 and suction cups 116.

In some examples, the LED strip 118 of the location beacon 100 can further pulse, show an animated pattern, or display a specific color that is readily visible to the approaching deliverer. By illuminating, the location beacon 100 eliminates the need for the deliverer to search for the delivery destination address (e.g., a house number). The location beacon 100 can also simultaneously act as a signal to a customer that a delivery is approaching. For example, when the deliverer enters the customer's geofence, the location beacon 100 can begin to flash or illuminate, indicating to the customer that the deliverer is nearby.

In some implementations, the illuminated indication provided by the LED strip 118 of the location beacon 100 can be accomplished by one or more multi-colored LEDs that can be controlled in brightness and color, allowing for multiple colors, sequences, and animations (e.g., in the case of a multi-element display). Animations of a multi-segment display can also convey the readiness of an order or distance from the delivery destination, i.e., used as a progress bar, the more bars that are illuminated, the closer the deliverer is to the location beacon 100. Moreover, while FIG. 1A illustrates the LED strip 118 as having 24 LED pixels, more or less LED pixels can be utilized. For example, a larger sized location beacon 100 can have more LED pixels, or an application where a brighter illumination is needed, more LED pixels can be included in the location beacon 100.

In other examples, the transceiver 112 of the location beacon 100 can connect the location beacon 100 wirelessly, either through a persistent cellular, Wi-Fi, other wireless, or Bluetooth Low Energy (BLE) connection to the internet directly or through an intermediate mobile device. For example, the location beacon 100 can receive an illumination trigger from the platform server 144 over the internet from a wireless connection. In some examples, the location beacon 100 can be connected to the internet via a cell tower, base station, or other country-wide wireless network suitable for the intended purpose and understood by a person of ordinary skill in the art.

In some aspects, the processor 124 as described herein can include a microcontroller, a local processor, or any other processor suitable for the intended purpose and understood by a person of ordinary skill in the art. The processor 124 of the location beacon 100 can further be configured to control color, animation, and timing of the illuminations presented by the LED strip 118.

Once the delivery is completed, the platform 144 can trigger the location beacon 100 to disengage and turn off.

In other implementations, the location beacon 100 can be utilized at a merchant location where multiple orders may need to be differentiated from one another. For example, if a restaurant has multiple orders, a location beacon 100 can be utilized for each order. Each of the location beacons 100 can then be associated with a corresponding color that differentiates itself from the other order's location beacons 100. In this example, when the deliverer arrives to collect the order, the deliverer can be provided with a color on their mobile application via the platform server 144 that is associated with the order to be picked up.

For example, the deliverer can receive the color blue on their mobile application from the platform server 144 that is associated with the order to be picked up from the corresponding restaurant. When the deliverer enters the geofence of the restaurant, the platform server 144 can send a signal (e.g., instructions) to the location beacon 100 to activate the LED strip 118 with the color blue, which is the color that was provided to the mobile application of the deliverer. In this example, the deliverer can readily determine which order to collect among the many orders sitting on a counter of the restaurant.

In some implementations, when many location beacons 100 are present next to one another, different variations of illumination may be utilized. For example, instead of a solid color, the location beacon 100 may flash, pulse, stream, intensify from side to side, animate, or any other type of illumination to differentiate itself from other location beacons 100 proximate to its location.

In other examples, the location beacons 100 can also guide merchants to a drop off location to a customer at a curbside zone. For example, the customer can have a location beacon 100 positioned on a windshield of their vehicle that can illuminate a signal to the merchant. The location beacons 100 can also guide merchants to stage items at a locker or a cubby (e.g., a smart shelf).

In some implementations, the location beacons 100 can be utilized by a merchant to signal to a deliverer that an order is ready for pick up at a counter or a locker/cubby (e.g., smart shelf). The location beacon 100 can also notify a deliverer where to collect items when there are multiple pick up stations. The location beacon 100 can also assist the deliverer by providing a drop off point of goods to be delivered.

In other implementations, multiple location beacons 100 can be "strung" together (e.g., as breadcrumbs) to lead the deliverer along a predetermined path from parking to collection to indoor navigation. For example, multiple location beacons 100 can be positioned in a line that leads to the front door of the restaurant that illuminate when the deliverer enters a geofence of the restaurant. A color/pattern can be assigned to a specific order for use at collection through drop off.

In some implementations, the location beacon 100 can guide a customer via a mobile application on a user equipment to collect an order from/within an autonomous vehicle. The location beacon 100 can further notify a customer when an order is ready for pickup at a counter or a locker/cubby (e.g., smart shelf). The location beacon 100 can also inform a customer on the status of their order and if it is delayed or canceled. For example, if an order is delayed or canceled, the platform server 144 can relay a message to a mobile application of the customer's user equipment via the location beacon 100 or provide the message directly to the customer's user equipment. In some examples, the location beacon 100 can assist a customer find their order from a locker/cubby (e.g., smart shelf). The location beacon 100 can also guide a customer to the correct spot at a curbside zone. The location beacon 100 can further notify a customer if a deliverer is attempting to reach them. For example, the location beacon 100 can flash red to indicate to the customer that the deliverer is attempting to call or text the customer.

In other implementations, the location beacon 100 can include additional inputs: switch/button to activate the location beacon 100; a geofence is entered (e.g., at drop off or at a merchant); customer arrives at a merchant for pick up; a deliverer pick up; a deliverer arrival; a delivery completed; on-time status (e.g., delta to predicted time); deliverer call to customer; location awareness for the location beacon 100; and a microphone. The location beacon 100 can further include software intelligence such as customized parameters for when and what to trigger, when to turn off, etc.

In some examples, the location beacon 100 can include additional outputs: if this, then that (IFTTT) integration with other hardware and external software; LED lights (e.g., color, animation, live progress, etc.); and sound (e.g., alerts). The location beacon 100 can further include mesh self-organizing networks that can include connecting multiple close proximity devices to a single IoT node. In some implementations, the location beacon 100 can further include inertial navigation (e.g., inertial measurement unit (IMU)), triangulation spatial awareness grid, 3D location services, inventory management (e.g., 3D scan of produce and software as a service (SaaS)), and scales.

Figure 2:
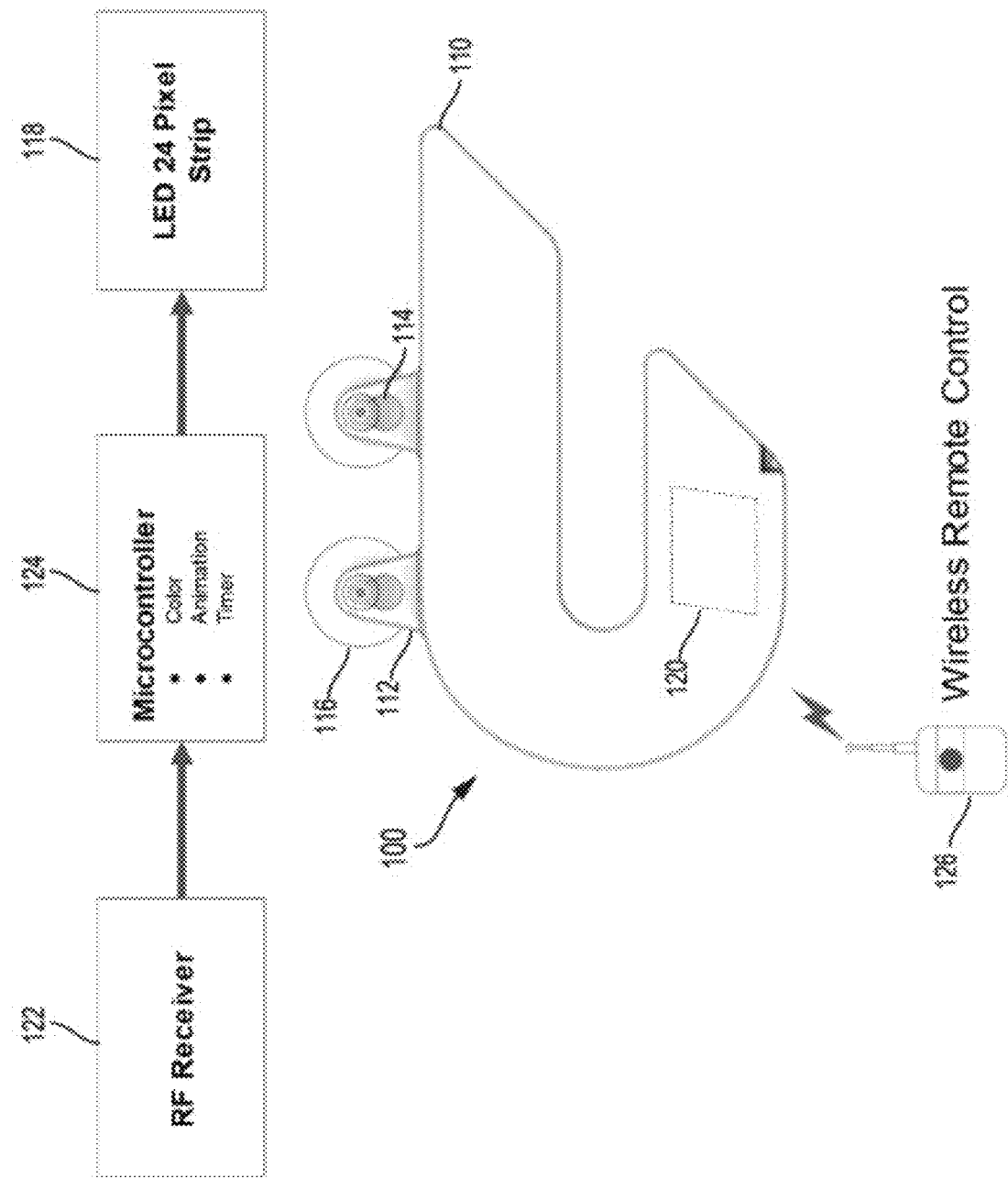
FIG. 2 illustrates an example location beacon along with a wireless remote control, according to some aspects of the disclosed technology.

FIG. 2 illustrates an example location beacon 100 along with a wireless remote control 126, according to some aspects of the disclosed technology. In some implementations, location beacon 100 can be controlled by a wireless remote controller 126. For example, where global positioning system (GPS) capabilities are insufficient in a given area to provide a geofence to a customer, the customer may utilize the wireless remote control 126 to activate the location beacon 100. The location beacon 100 may further include switch (not shown) to manually activate and deactivate the location beacon 100.

FIG. 3 illustrates a side view of an example location beacon 100 attached to a surface 136 (e.g., a window, a wall, etc.), according to some aspects of the disclosed technology. In some implementations, the location beacon 100 may be fastened to an interior side of a home window by utilizing the suction cups 116 on the home window. By positioning the location beacon 100 as shown in FIG. 3, the light 138 illuminated by the LED strip 118 will project to the outside of the house to catch the attention of the deliverer.

Figure 4:
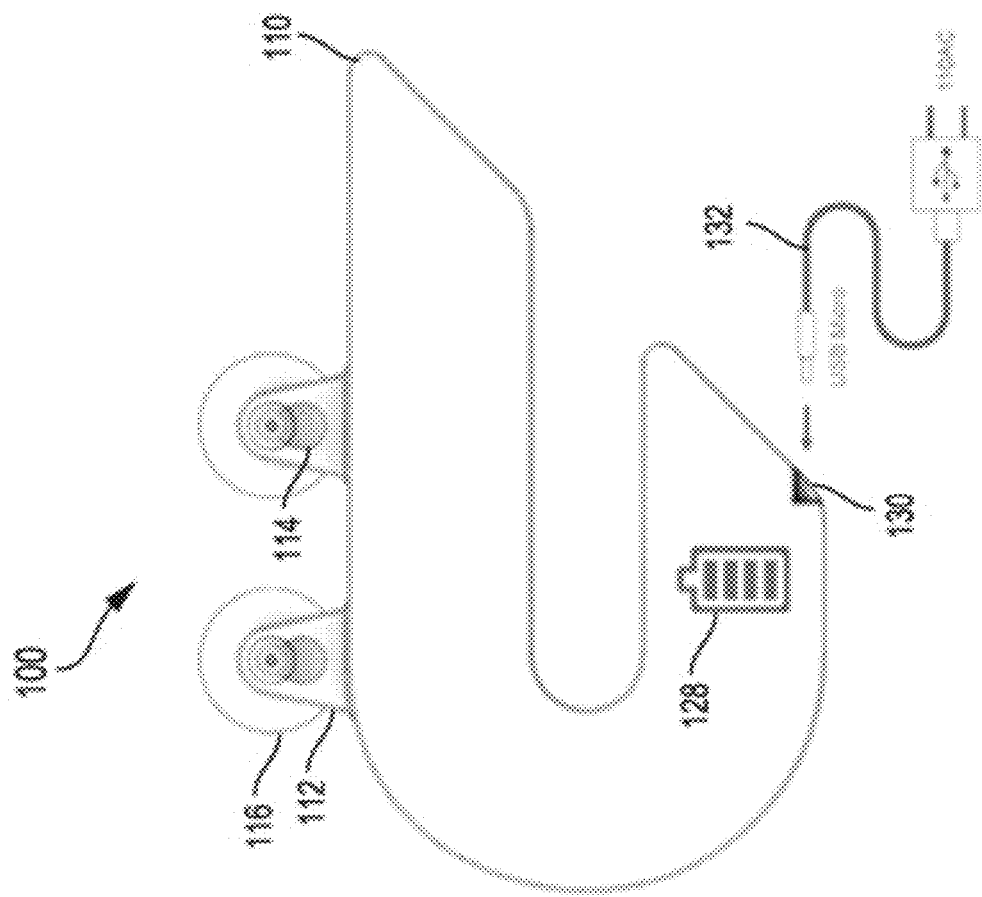
FIG. 4 illustrates an example location beacon along with a USB micro connection, according to some aspects of the disclosed technology.

FIG. 4 illustrates an example location beacon 100 along with a USB micro connection 132, according to some aspects of the disclosed technology. In some implementations, the location beacon 100 can include an interface 130 (e.g., a micro USB interface) to connect a battery 128 of the location beacon 100 to a power source (e.g., a 110 AC wall power source).

Figure 5:
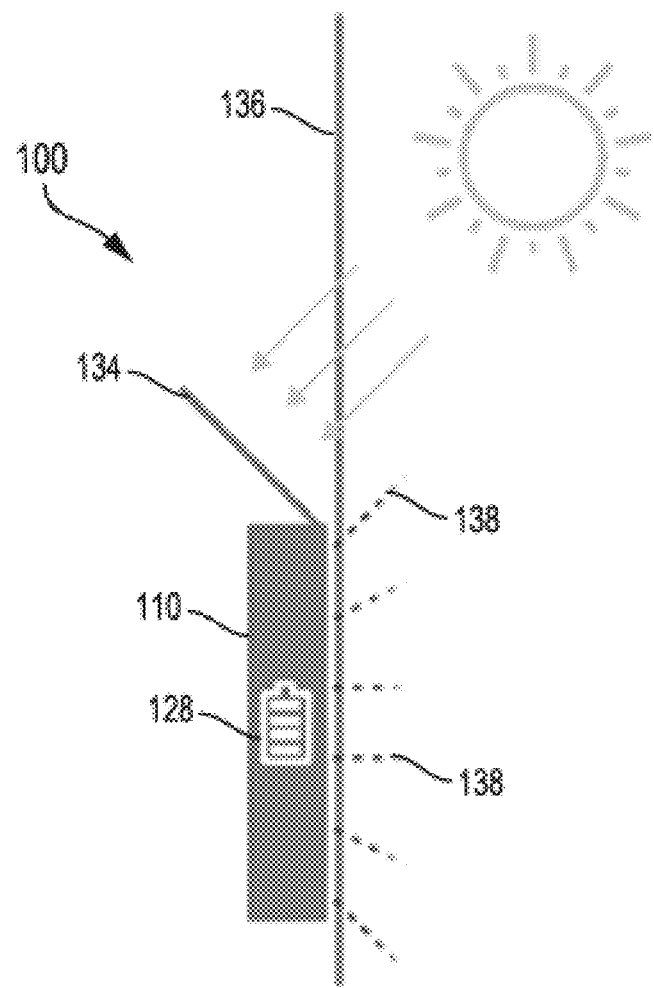
FIG. 5 illustrates an example location beacon along with a solar panel, according to some aspects of the disclosed technology.

In some implementations, the location beacon 100 can further include and be powered via a battery 128 that may be a non-rechargeable or rechargeable battery from an internal power source 128, an external power source, or a solar cell 134 of FIG. 5.

FIG. 5 illustrates an example location beacon 100 along with a solar panel 134, according to some aspects of the disclosed technology. In some implementations, the location beacon 100 can include a solar panel/cell 134 to power the battery 128 of the location beacon 100. As shown in FIG. 5, even though the solar panel 134 is positioned inside of the house, the window 136 allows sunrays to pass through and charge the solar panel 134.

FIG. 6 illustrates an example location beacon 100 along with a stake 140, according to some aspects of the disclosed technology. In some implementations, the location beacon 100 can include a stake 140 that can be positioned the location beacon 100 on a lawn 142. For example, the front door or front side of the customer's house may not be readily visible from the street. In such an example, the customer can stake the location beacon 100 further out from their house at a location that is visible to the deliverer. In some examples, the stake 140 and the housing 110 of the location beacon 100 can be one homogenous unit.

Figure 7:
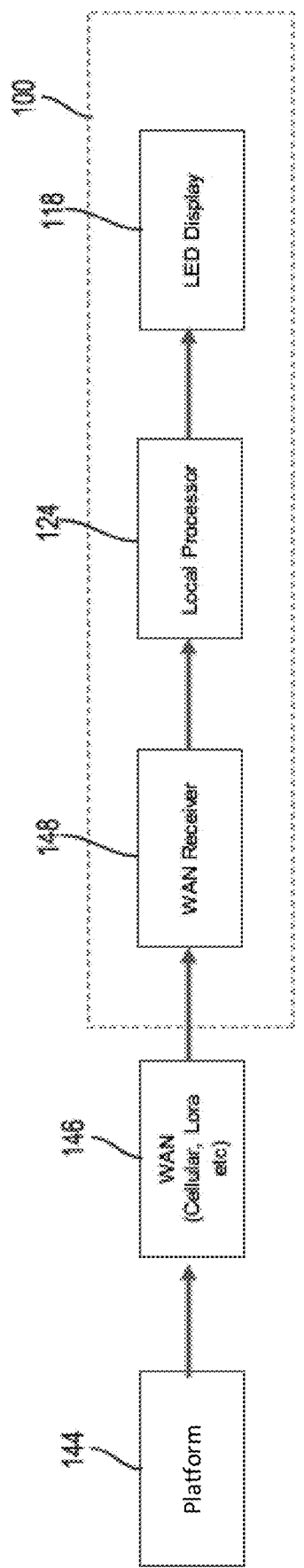
FIG. 7 illustrates an example location beacon having a Wide Area Network (WAN) receiver, according to some aspects of the disclosed technology.

FIG. 7 illustrates an example location beacon 100 having a WAN receiver 148, according to some aspects of the disclosed technology. In some implementations, the location beacon 100 can include a wide area network (WAN) receiver 148, a local processor 124, and an LED display 118. The location beacon 100 can further communicate with the platform server 144 via a WAN connection 146 (e.g., a cellular connection, a lower power, WAN protocol (e.g., Lora), etc.).

In other implementations, a user or the platform server 144 can associate a unique appliance serial number of the location beacon 100 of a user account with the location beacon 100, which can be connected to the platform server 144. Platform server 144 can also provide low bandwidth, IoT cell service plans to location beacons 100 to provide wireless internet access so that the location beacon 100 can communicate with a user or the platform server 144.

In some examples, the location beacon 100 can be connected to the internet via a low bandwidth cellular connection or other country-wide wireless WAN services. A user can onboard the location beacon 100 by entering a serial number or taking a photo of a QR code on the location beacon 100. An appliance serial number of the location beacon 100 can be paired with an account on the platform server 144 and establish a control path with the platform server 144. A specific appliance ID can also be paired with a specific address within an account with multiple addresses.

Figure 8:
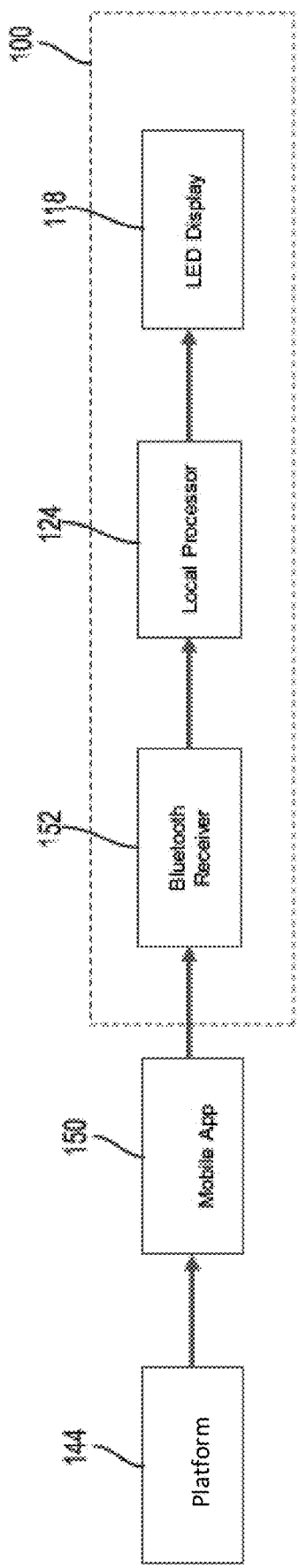
FIG. 8 illustrates an example location beacon having a Bluetooth receiver, according to some aspects of the disclosed technology.

FIG. 8 illustrates an example location beacon 100 having a Bluetooth receiver 152, according to some aspects of the disclosed technology. In some implementations, the location beacon 100 can include a Bluetooth receiver 152, a local processor 124, and an LED display 118. The location beacon 100 can further communicate with the platform server 144 via a mobile application 150 on a user equipment of a customer.

In other implementations, the location beacon 100 can be paired with a customer's mobile phone and a mobile application 150 via Bluetooth low energy (BLE). An intermediate repeater device may also be implemented to extend BLE range.

Figure 9:
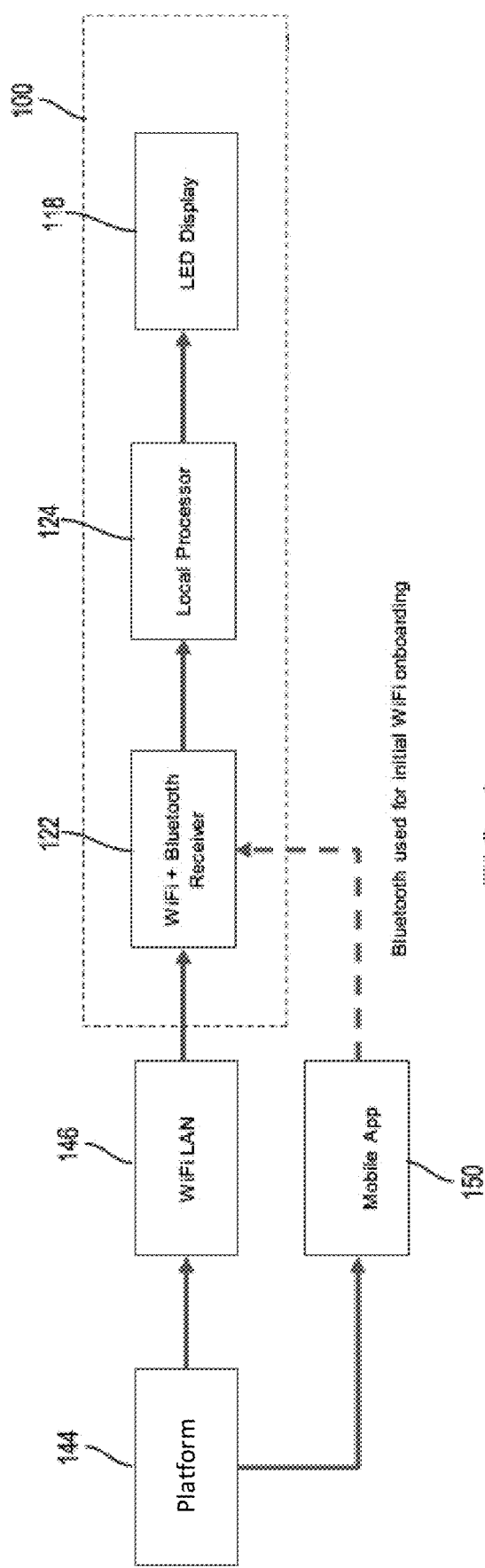
FIG. 9 illustrates an example location beacon having a Wi-Fi and Bluetooth receiver, according to some aspects of the disclosed technology.

FIG. 9 illustrates an example location beacon 100 having a Wi-Fi and Bluetooth receiver 122, according to some aspects of the disclosed technology. In some implementations, the location beacon 100 can include a Wi-Fi/Bluetooth receiver 122, a local processor 124, and an LED display 118. The location beacon 100 can further communicate with the platform server 144 via a Wi-Fi local area network (LAN) 146. The location beacon 100 can also utilize the Bluetooth receiver 122 for an initial Wi-Fi onboarding via a mobile application 150 on a user equipment of a customer.

In some examples, a user's wireless internet connectivity (e.g., Wi-Fi) can provide internet connectivity to the location beacon 100. For example, the location beacon 100 can include an onboarding process involving entering network credentials into the location beacon 100, thereby providing internet connectivity to the location beacon 100. In other examples, the onboarding process can include entering network credentials via Bluetooth from a mobile application or via USB connection with a user equipment (e.g., a computer, a laptop, or a tablet). In another example, the user can connect to the location beacon 100 via a mobile application on a user equipment (e.g., a smartphone, computer, tablet) that utilizes Bluetooth Low Energy (BLE). The location beacon 100 can utilize both types of connectivity (e.g., Wi-Fi and BLE) to maintain a connection with the user equipment or the platform server 144.

In other examples, a user equipment and a mobile application 150 can connect to the location beacon 100 via BLE to specify credentials to connect to a local Wi-Fi network. Once initial onboarding is complete, the user equipment is not necessary and the location beacon 100 can be connected with full internet access via a Wi-Fi connection.

Figure 10:
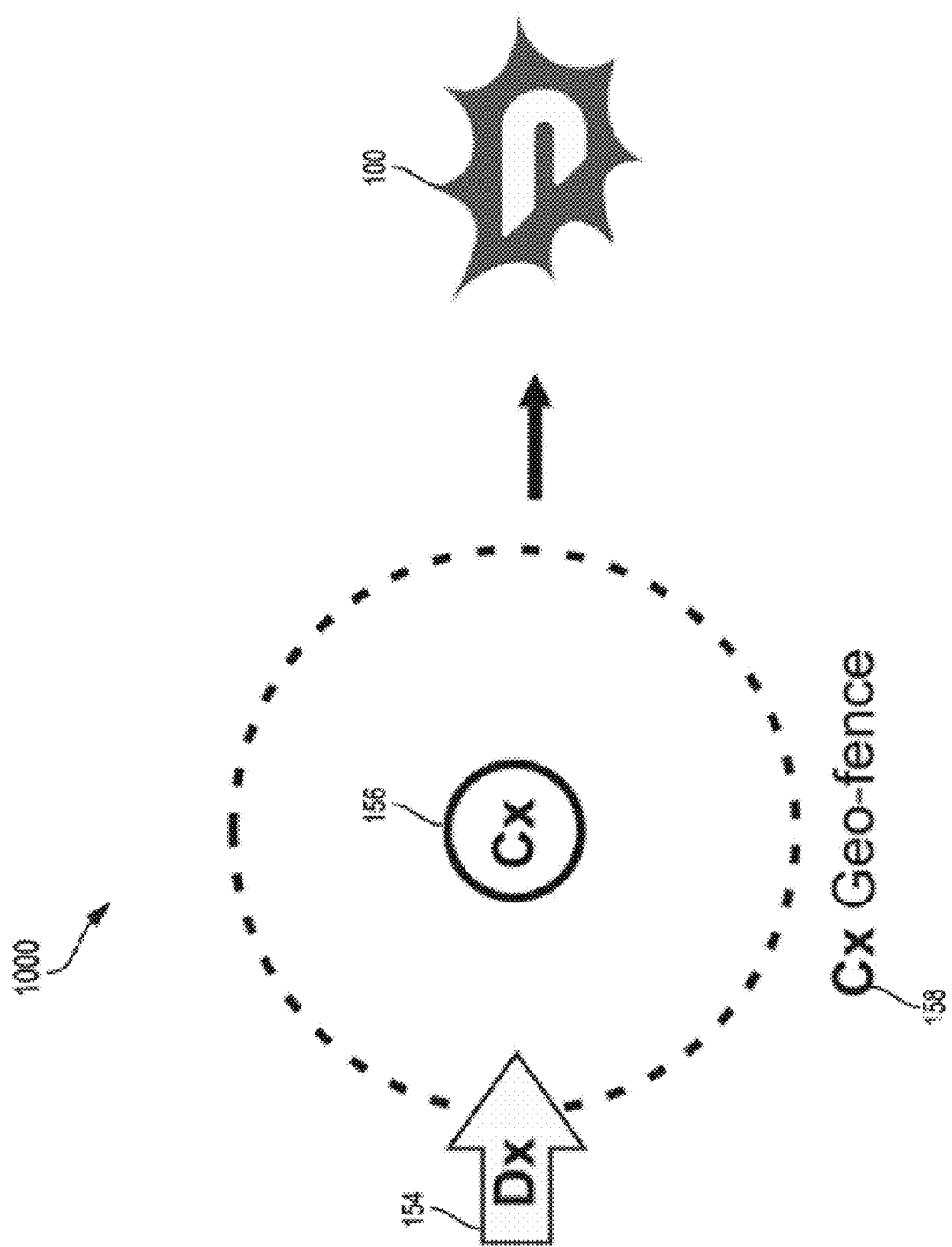
FIG. 10 illustrates an example diagram of activating a location beacon, according to some aspects of the disclosed technology.

FIG. 10 illustrates an example diagram of activating a location beacon 100, according to some aspects of the disclosed technology. In some implementations, a virtual Cx (e.g., customer) geofence zone 158 can be established around a customer delivery destination (Cx) 156. A deliverer (Dx) 154 approaching the Cx destination 156 can cross the geofence 158. Crossing of the geofence 158 by the deliverer 154 can trigger a signal sent to the location beacon 100, which can then illuminate the customer's 156 location beacon 100. The location beacon 100 can illuminate an animation, blink, or present a specific color, which makes it easier for the deliverer 154 to spot the customer's location 156 from their vehicle, thereby guiding the deliverer 154 to the customer 156 in a more efficient manner than having to look for a house number or door. The location beacon 100 can also be illuminated the entire time the deliverer 154 is within the geofence 158, and until the location beacon 100 is triggered to be turned off by the delivery being marked as "delivered" in the platform 144.

Figure 11:
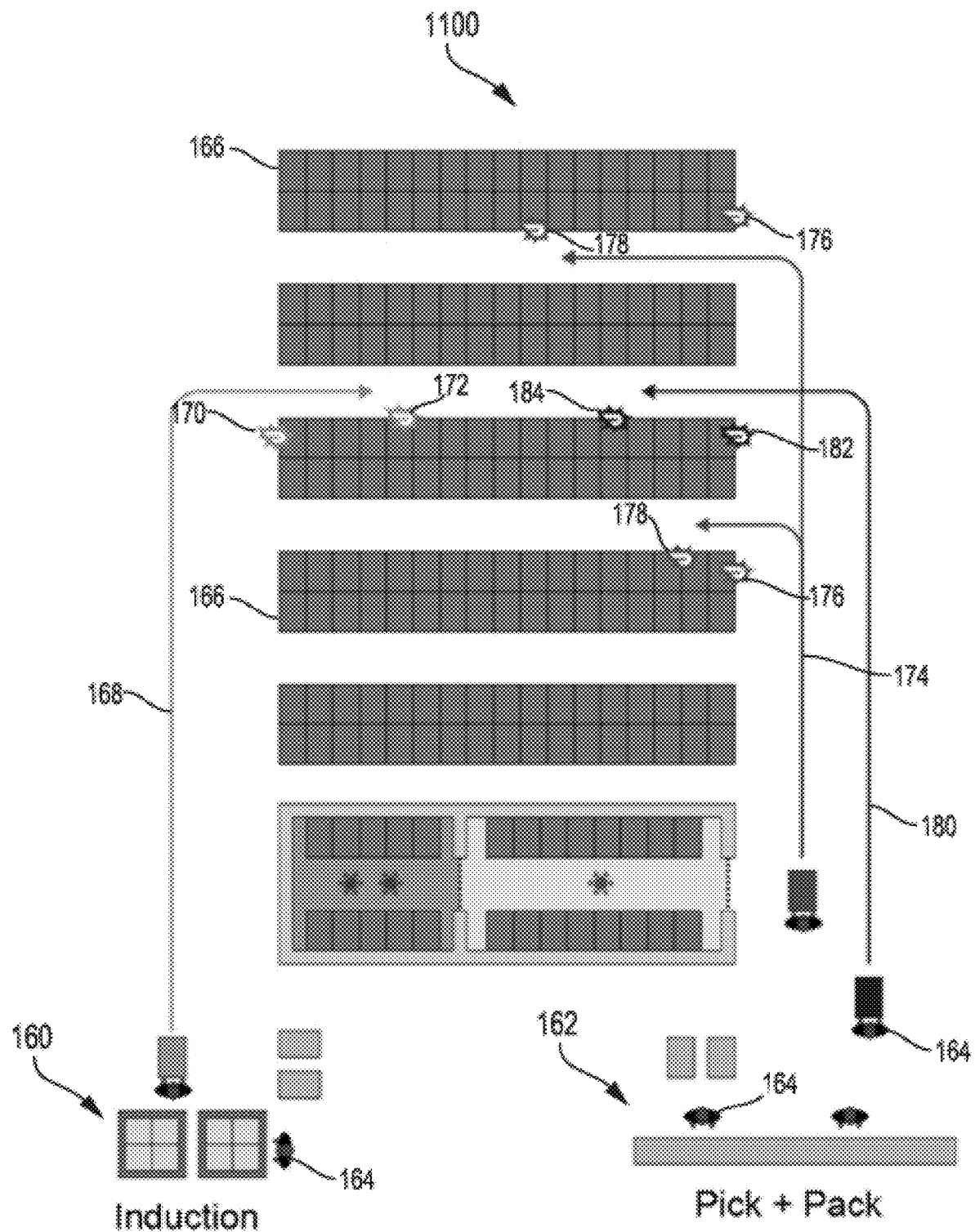
FIG. 11 illustrates an example diagram of utilizing location beacons in a commercial setting, according to some aspects of the disclosed technology.

FIG. 11 illustrates an example diagram of utilizing location beacons 170, 172, 176, 178, 182, 184 in a commercial setting 1100, according to some aspects of the disclosed technology. In some implementations, the commercial setting 1100 can include workers 164 positioned at two stations to place and retrieve products from shelves 166: an induction station 160 and a pick and pack station 162. At induction station 160, the workers 164 can travel along path 168 by following illuminated location beacon 170 (e.g., an aisle marker) to illuminated location beacon 172 (e.g., a shelf marker) to place a product on the shelf 166. At pick and pack station 162, the workers 164 can travel along paths 174, 180 by following illuminated location beacons 176, 182 (e.g., an aisle markers) to illuminated location beacons 178, 184 (e.g., shelf markers) to retrieve a product from the shelf 166.

In other implementations, location devices 170, 172, 176, 178, 182, 184 can be utilized throughout a commercial setting (e.g., DashMart) to single out (or track) a specific product/SKU on a shelf for a shopper or deliverer to collect, also referred to in this disclosure as a pick-to-light system. Using the location devices 170, 172, 176, 178, 182, 184 in this application can provide a low cost and efficient solution to the problem of being unable to find a product, which can also be maintained by the platform server 144.

Figure 12:
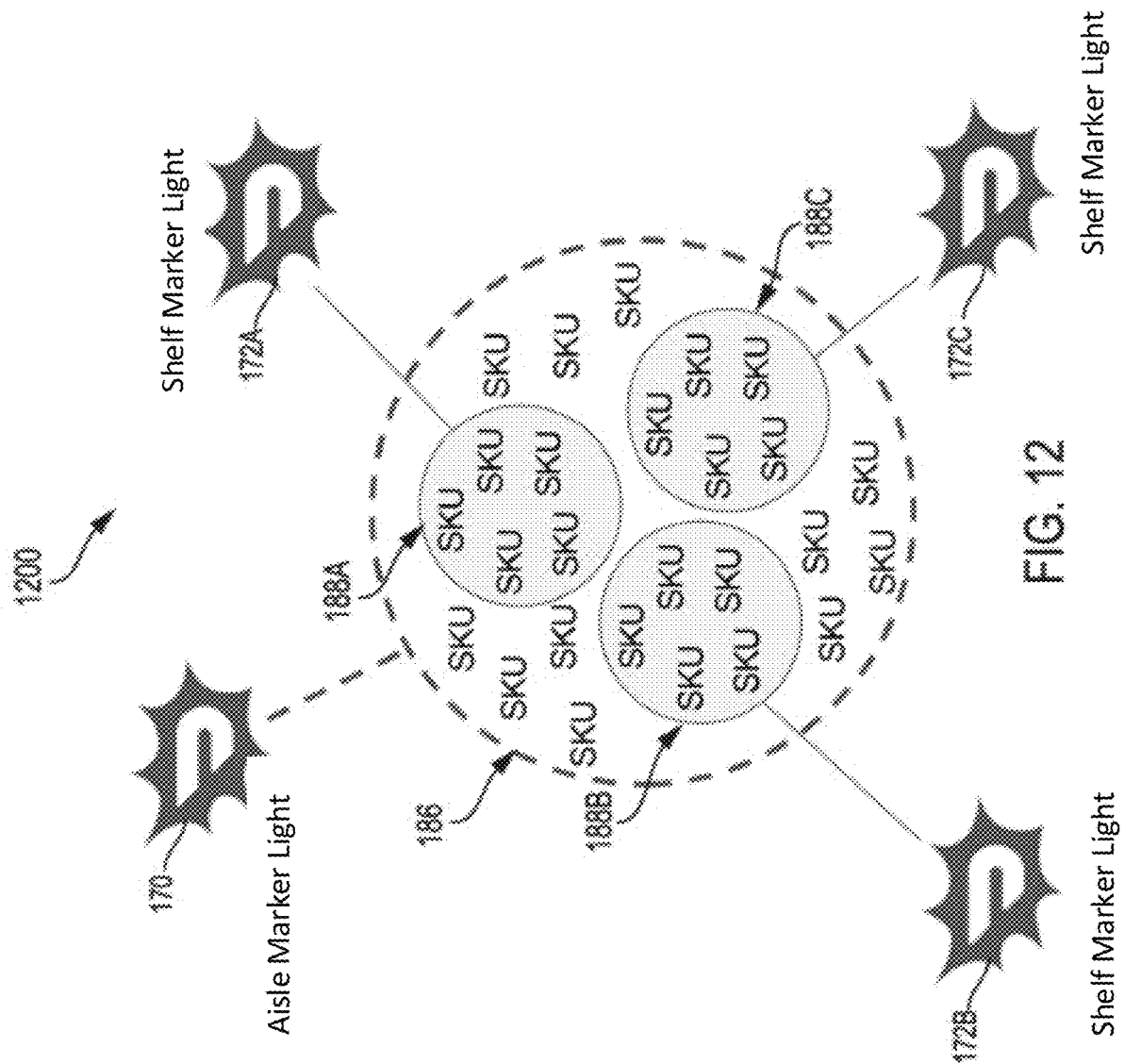
FIG. 12 illustrates an example diagram of location beacons that are associated with corresponding Stock-Keeping Units (SKUs), according to some aspects of the disclosed technology.

FIG. 12 illustrates an example diagram of a location beacon system 1200 including a plurality of location beacons 170, 172A, 172B, 172C that are associated with corresponding SKUs, according to some aspects of the disclosed technology. In some implementations, a group of SKUs 186 can be linked to two types of marker lights, aisle marker 170 and shelf marker 172A/172B/172C. The group of SKUs 186 can include various SKUs. For example, aisle marker 170 can be utilized for macro navigation, and shelf markers 172A, 172B, 172C can be positioned within the aisle to provide a more specific location. A subset of SKUs 188A/188B/188C also can be linked to each of shelf markers 172A, 172B, 172C. For example, a shelf marker 172A, 172B, 172C can direct a worker 164 to a general area where a cluster of products (e.g., a subset of SKUs 188A, 188B, 188C) may be located. The location beacon system 1200 can be based on linking a marker serial number to the SKUs 186 within a database of the location beacon system 1200. In some examples, the location beacon system 1200 can include leverage hardware such as wireless connectivity (e.g., LAN and WAN), platform integration, and RGB multi-pixel LED (e.g., colors and animations).

Figure 13:
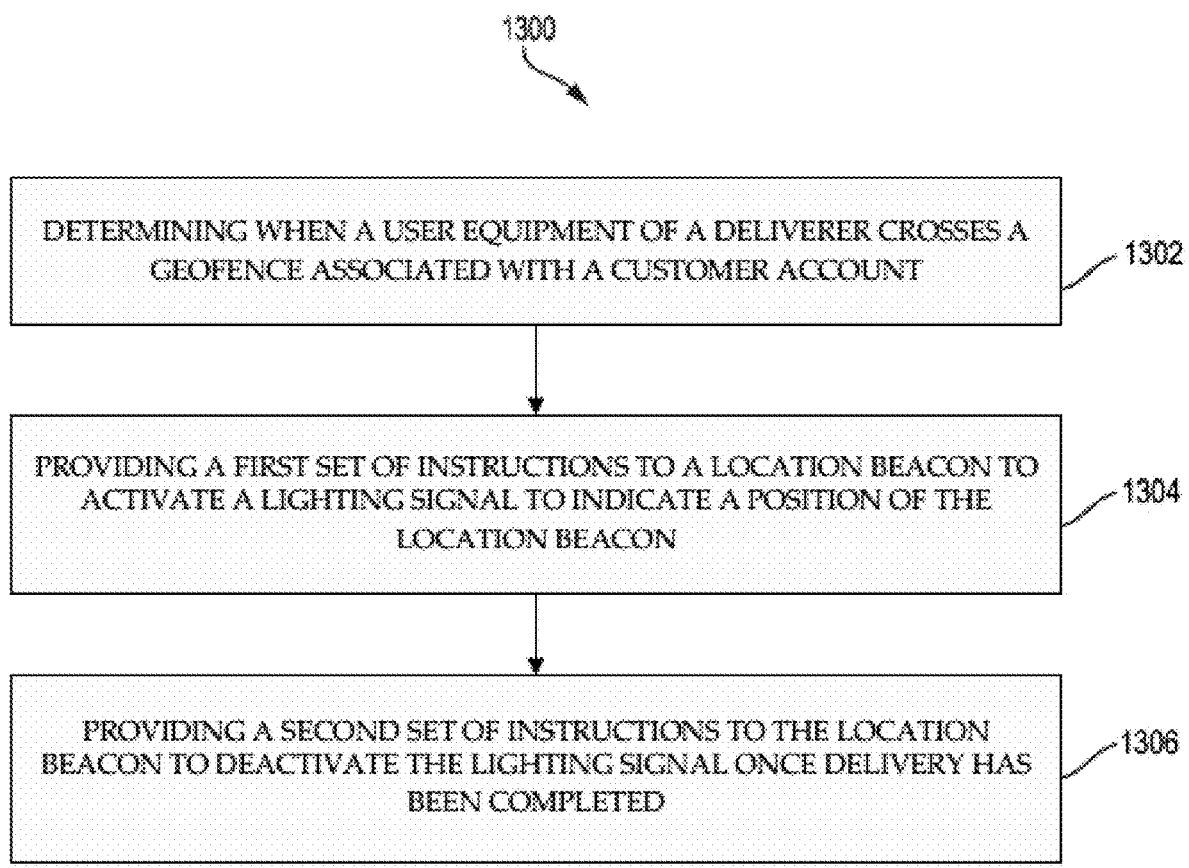
FIG. 13 illustrates an example process of utilizing a location beacon, according to some aspects of the disclosed technology.

Having disclosed some example system components and concepts, the disclosure now turns to FIG. 13, which illustrates a flowchart of a method 1300 for utilizing a signaling location beacon (e.g., location beacon 100 as previous described). The method 1300 shown in FIG. 13 is provided by way of example, as there are a variety of ways to carry out the method. Additionally, while the example method 1300 is illustrated with a particular order of steps, those of ordinary skill in the art will appreciate that FIG. 13 and the modules shown therein can be executed in any order and can include fewer or more modules than illustrated. Each module shown in FIG. 13 represents one or more steps, processes, methods or routines in the method 1300.

At step 1302, method 1300 can include determining when a user equipment of a deliverer crosses a geofence associated with a customer account. As will be discussed in greater detail later, such geofence crossing can be part of an interaction between a signaling location beacon, otherwise referred to as a "physical beacon," (e.g., location beacon 100 as illustrated in FIGS. 1A-10) and the deliverer.

At step 1304, method 1300 can include providing a first set of instructions to a location beacon to activate a lighting signal to indicate a position of the location beacon. For example and as will be discussed in greater detail later, the location beacon can be illuminated based on the interaction to provide a sensory signal to the delivery person.

At step 1306, method 1300 can include providing a second set of instructions to the location beacon to deactivate the lighting signal once delivery has been completed. Alternatively, any sensory signal that is provided to the delivery person based on the interaction can be deactivated. Such deactivation can occur based on passing of a specific amount of time or based on completion of item delivery or pickup.

Figure 14:
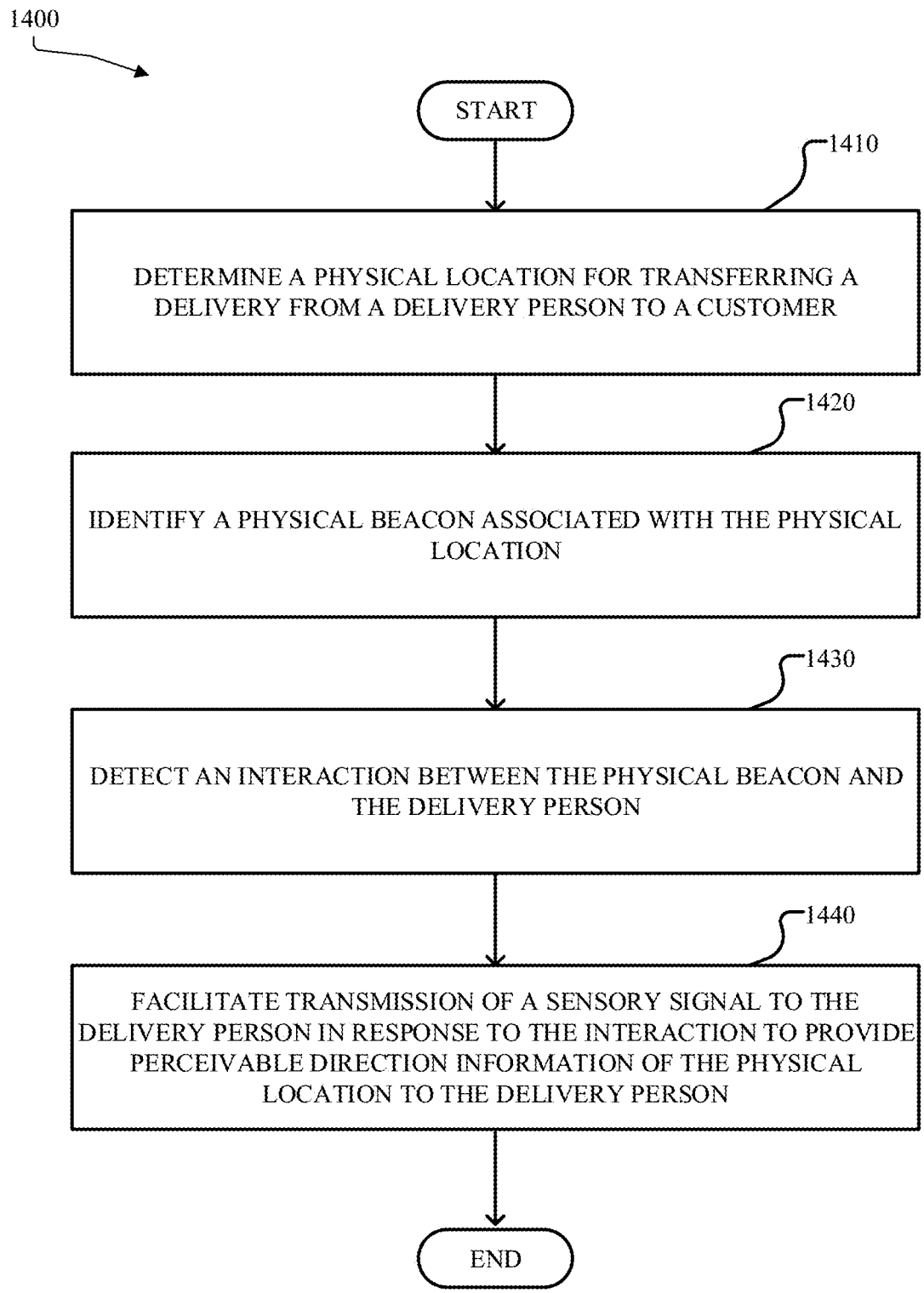
FIG. 14 illustrates a flowchart for an example method of facilitating transmission of a sensory signal of direction information to a delivery person based on an interaction between the delivery person and a physical beacon, according to some aspects of the disclosed technology.

FIG. 14 illustrates a flowchart for an example method 1400 of facilitating transmission of a sensory signal of direction information to a delivery person based on an interaction between the delivery person and a physical beacon, according to some aspects of the disclosed technology. The method 1400 shown in FIG. 14 is provided by way of example, as there are a variety of ways to carry out the method. Additionally, while the example method 1400 is illustrated with a particular order of steps, those of ordinary skill in the art will appreciate that FIG. 14 and the modules shown therein can be executed in any order and can include fewer or more modules than illustrated. Each module shown in FIG. 14 represents one or more steps, processes, methods or routines in the method 1400.

At step 1410, a physical location for transferring a delivery, e.g. a delivery location, from a delivery person to a customer is determined. The physical location can be a location of the customer or a rendezvous point for picking up the delivery. For example, the physical location can be a home or office space of a customer. A delivery, as used herein, includes an item that can be transported and transferred to a customer. More specifically, a delivery can include an item that can be picked up, transported to a location, and transferred to a customer at the location. For example, a delivery can include food items that are picked up from a restaurant and transferred to a customer. In another example, a delivery can include a grocery item that is picked up from a merchant and transferred to a customer.

At step 1420, a physical beacon associated with the physical location is identified. A physical beacon can include an applicable physical device for facilitating the transmission of signals to a delivery person for guiding the delivery person to a location, such as the beacons described here. The physical beacon can be used in facilitating transmission of a sensory signal to a delivery person, as will be described in greater detail later. A sensory signal, as used herein, can include a signal that is capable of being perceived by a human, e.g. the delivery person. Specifically, a sensory signal can include a signal that is capable of being perceived by the delivery person while the delivery person is involved in a step associated with either or both picking up the delivery and transferring the delivery to the customer. For example, a sensory signal can include a visual signal that can be seen by the delivery person while they are delivering a package. In another example, a sensory signal can include an auditory signal that can be heard by the delivery person when they are picking up an item for delivery.

The physical beacon can be associated with the physical location based on a position of the beacon in relation to the physical location. Specifically, the physical beacon can be at the physical location. For example, the physical beacon can illuminate to signify presence of the physical location at the physical location. Further, the physical beacon can be in proximity to the physical location but not actually at the physical location. For example, the physical beacon can illuminate to indicate a direction of the physical location. Additionally, the physical beacon can be part of a plurality of physical beacons that are at the physical location or in proximity to the physical location. For example, the physical beacon can be part of a plurality of physical beacons that form a trail to or towards the physical location. Further in the example, the physical beacons can be illuminated to create a visible trail to or towards the physical location.

The physical beacon can be physically placed at a position in relation to the physical location as part of being associated with the physical location. For example, the physical beacon can be placed in a front yard of a house in order to facilitate the transfer of deliveries at the house. In another example, the physical beacon can be placed at an entrance of a street to facilitate the transfer of deliveries to one or more houses on the street.

Additionally, the physical beacon can be associated with a customer, e.g. for transferring deliveries to the customer. For example, the physical location can be associated with a customer at a home location and used in facilitating transfer of delivers to the customer at the home location. Additionally, the physical beacon can be associated with a plurality of different customers. For example, the physical beacon can be at an office location and associated with different customers at the office location. As follows, when the different customers place orders for deliveries, the physical beacon can be used in facilitating transfer of the deliveries to the different customers at the office location.

The physical beacon can be associated with one or more customers based on an anticipated transfer of one or more deliveries to the one or more customers, e.g. at a physical location that is associated with the physical beacon. For example, the physical beacon can be physically placed at a home of a customer and associated with the customer, e.g. based on being physical placed at the home of the customer. In turn, the physical beacon can be used in facilitating transfer of deliveries to the customer at the home based on the association of the beacon with the customer.

In being associated with a plurality of customers for facilitating transfer of different deliveries to the customers, the physical beacon can be customer agnostic. Customer agnostic, as used herein, includes that the physical beacon can be associated with a plurality of different customers without being specific to each of the customers. In particular, any of the customers that are associated with the physical beacon can use the physical beacon to facilitate transfer of different deliveries in a shared manner, e.g. potentially at the same time.

A peripheral device to the physical beacon can be used in associating the physical beacon with either or both a physical location and a customer. For example, a global GPS-enabled device can be operated in relation to the physical beacon to determine and/or input a physical location of the physical beacon. In another example, a delivery application-enabled device can be operated to scan or otherwise detect the physical beacon and associate the beacon with a customer. More specifically, the physical beacon can be onboarded to a network, e.g. through an applicable connection to the network, and a customer can be associated/paired with the physical beacon, e.g. in a delivery application, through the network.

Returning back to the flowchart shown in FIG. 14, at step 1430, an interaction is detected between the physical beacon and the delivery person. An interaction, as used herein, includes an event that occurs based on the physical beacon and the delivery person being in physical proximity to each other. Physical proximity, as used herein with respect to an interaction, can include the physical beacon and the delivery person being separated by a physical distance such that the physical beacon can be used to guide the delivery person to a specific location. For example, the physical beacon and the delivery person can be close enough so that the delivery person can view the physical beacon as part of the beacon guiding the delivery person to a specific location. In another example, the physical beacon and the delivery person can be close enough so that the beacon can trigger the transmission of a sensory signal through a device used by the delivery person. An interaction occurring between the physical beacon and the delivery person can occur during a delivery process in which the delivery person is transferring a delivery to a customer. Further, an interaction occurring between the physical beacon and the delivery person can occur during a pickup/collection process in which the delivery person is picking up an item to be delivered to a customer.

An interaction between the physical beacon and the delivery person can be triggered based on a boundary that is defined with respect to the physical beacon, otherwise referred to as a geofence. Specifically, an interaction between the physical beacon and the delivery person can be initiated when the delivery person crosses a boundary surrounding the physical beacon. For example, when the delivery person is within a boundary defined as 50 meters away from the physical beacon, then an interaction between the physical beacon and the delivery person can be triggered. While reference is made to the interaction occurring between the delivery person and the physical beacon, an interaction can actually occur between a device of the delivery person and the physical beacon. More specifically, an interaction can occur between the physical beacon and a device that is physically near the delivery person to serve as an accurate representation or approximation of the location of the delivery person. For example, a smart device in a car driven by the delivery person can serve to trigger an interaction with the physical beacon.

At step 1440, transmission of a sensory signal to the delivery person is facilitated in response the interaction occurring between the physical beacon and the delivery person. The sensory signal can provide perceivable direction information associated with the physical location to the delivery person. The direction information can include applicable information that can be perceived by the delivery person to provide directions to the physical location. Specifically, the direction information can include information that provides directions to the physical location in relation to a location of the physical beacon. For example, the direction information can inform the delivery person that the physical beacon is at the delivery location. In another example, the direction information can indicate, to the delivery person, a direction to the physical location, e.g. in relation to the physical beacon. The sensory signal can be transmitted to the delivery person during a delivery process in which the delivery person is transferring a delivery to a customer or during a pickup/collection process in which the delivery person is picking up an item to be delivered to a customer In facilitating transmission of the sensory signal to the delivery person, the physical beacon itself can generate and transmit the sensory signal to the delivery person. The sensory signal can be generated and/or transmitted by the physical beacon in one or more applicable forms. For example, the physical beacon can illuminate to create a visual signal that is viewable by the delivery person. In another example, the physical beacon can generate an auditory signal that the delivery person can hear.

Further, a device that is in proximity to the delivery person and the separate from the physical beacon can be controlled to generate and transmit the sensory signal to the delivery person. Specifically, instructions to generate a visual representation of directions to the physical location can be sent to a smart device that is viewable by the delivery person. As follows, the smart device can generate the visual representation to provide the directions to the delivery person. The physical beacon can be used in controlling the device that is in proximity to the delivery person to generate and transmit the sensory signal to the delivery person. For example, the physical beacon can transmit control instructions for generating the sensory signal to a smart phone in proximity to the delivery person. In controlling the device to generate and transmit the sensory signal, the physical beacon can either send the control instructions to the device over a LAN or a WAN. For example, the physical beacon can be connected to the device over a short range wireless connection and transmit the instructions to the device over the short range wireless connection. In another example, the physical beacon can be connected to the device over a WAN and transmit the instructions to the device through the internet.

The sensory signal can be transmitted to the delivery person in response to both the interaction occurring between the physical beacon and the delivery person and an association of the physical beacon with a specific customer. In particular, the sensory signal can be transmitted to the delivery person based on the interaction and the physical beacon being associated with a specific customer who is the subject of the delivery. As a result, a number of interaction events can occur between different delivery drivers and the physical beacon. However, the delivery people can be delivering items to customers who are not associated with the physical beacon, e.g. the physical beacon is not indicative of the physical locations of the customers. Accordingly, even though the interactions do occur with the physical beacon, sensory signals are not transmitted based solely on these interactions. This is particularly advantageous in dense traffic environments where a number of delivery people pass in proximity to deployed physical beacons.

The sensory signal can be generated and transmitted to the delivery person based on the location of the physical beacon in relation to the physical location. Specifically, variable characteristics of the sensory signal can be selected based on the location of the physical beacon in relation to the physical location. For example, the color of the physical beacon can be adjusted as a delivery person approaches the delivery location. In another example, a specific color can be used to illuminate the physical beacon if the physical beacon is actually at a delivery location. Likewise, a different color can be used to illuminate the physical beacon if the physical beacon is positioned away from the physical location, e.g. as part of a group of physical beacons that form a path towards the physical location.

The physical beacon can be location aware. Specifically, the physical beacon can include hardware and/or software for identifying a position or location of the physical beacon, e.g. in relation to the delivery location or location for picking up a delivery item. As follows, the physical beacon can generate and transmit the sensory signal based on the self-identified location of the physical beacon. For example, the physical beacon can identify that the current location of the beacon is 50 feet north of a delivery location. Further in the example, the physical beacon can generate a sensory signal that points south for directing a delivery person to the delivery location.

Figure 15:
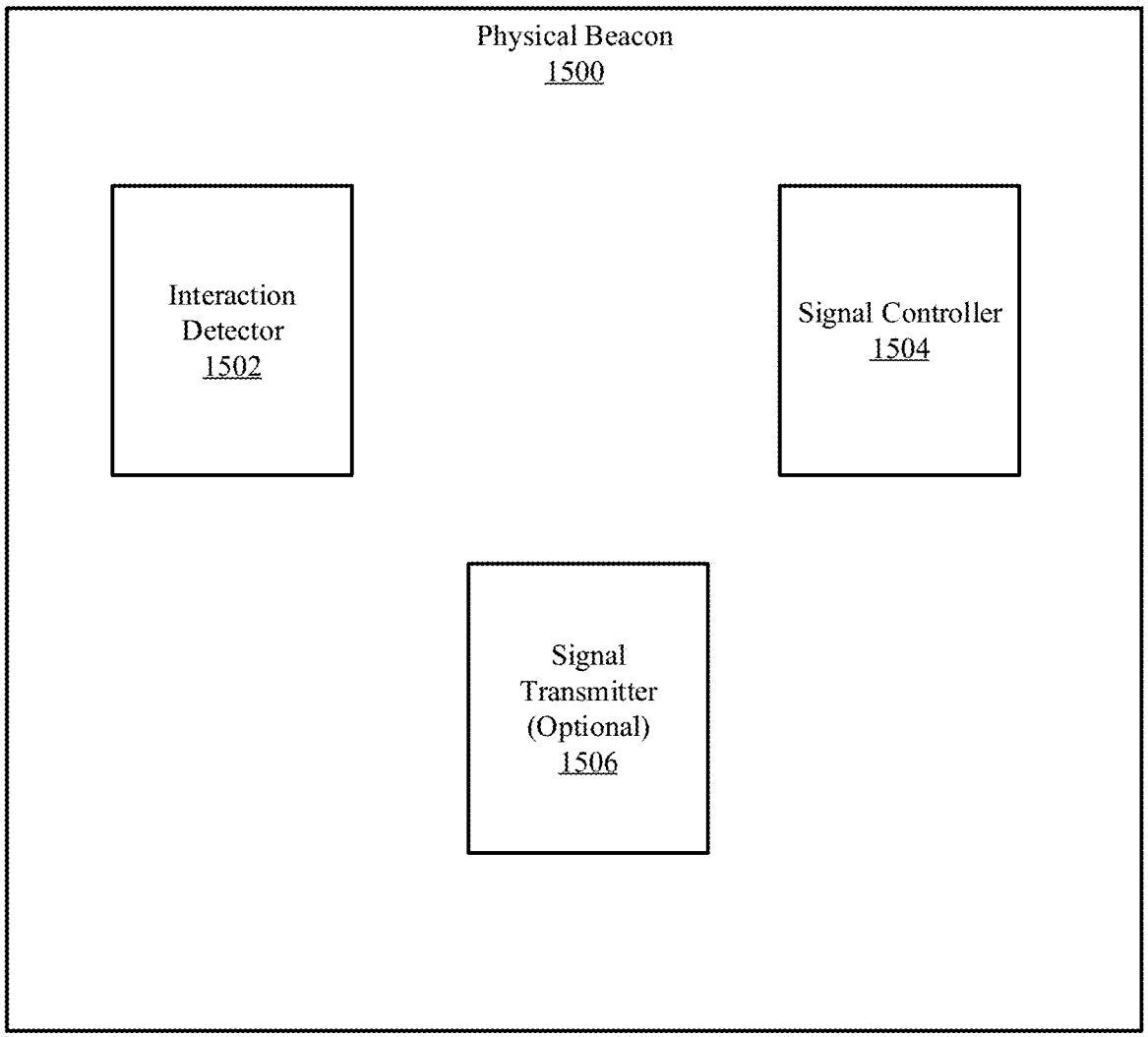
FIG. 15 illustrates an example schematic diagram of a physical beacon, according to some aspects of the disclosed technology.

FIG. 15 illustrates an example schematic diagram of a physical beacon 1500, according to some aspects of the disclosed technology. The physical beacon 1500 can be used in facilitating delivery of an item to a delivery location according to the various embodiments described herein. Further, the physical beacon 1500 can be used in facilitating collection of an item for delivery according to the various embodiments described herein.

The physical beacon 1500 includes an interaction detector 1502, a signal controller 1504, and optionally a signal transmitter 1506. The interaction detector 1502 includes an applicable system for detecting an interaction between the physical beacon 1500 and a delivery person. Specifically, the interaction detector 1502 includes either or both software and hardware for detecting an interaction that occurs between the physical beacon 1500 and a delivery person based on proximity of the delivery person to the physical beacon 1500. For example, the interaction detector 1502 can include a sensor configured to sense that a delivery person is within proximity of the physical beacon 1500 based on a signal received from a device associated with the delivery person.

The signal controller 1504 controls generating and transmission of a sensory signal to the delivery person. Specifically, the signal controller 1504 controls generating and transmission of a sensory signal to the delivery person based on an interaction between the physical beacon 1500 and the delivery person. In controlling generation and transmission of a sensory signal to the delivery person, the signal controller 1504 can control a device in proximity to the delivery person through a WAN or LAN. For example, the signal controller 1504 can cause a deliver application running on a smart device of the delivery person to generate a sensory signal and transmit the sensory signal to the delivery person.

The signal transmitter 1506 includes one or more systems for generating and transmitting a sensory signal from the physical beacon 1500 to the delivery person. In particular, the signal transmitter 1506 includes either or both software and hardware for generating and transmitting a sensory signal from the physical beacon 1500 to the delivery person. The signal transmitter 1506 can generate and transmit a sensory signal based on instructions received from the signal controller 1504.

Figure 16:
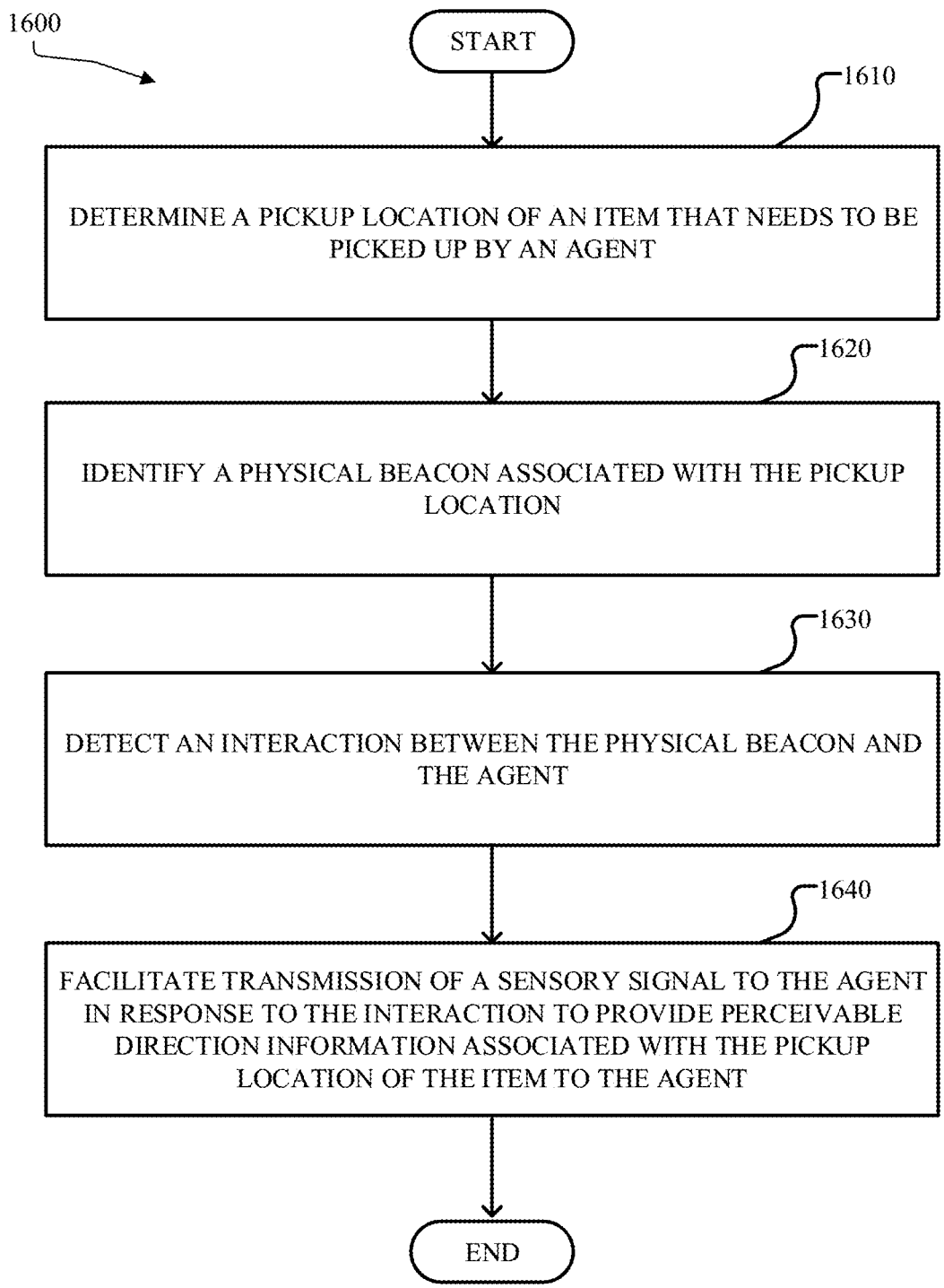
FIG. 16 illustrates a flowchart for an example method of facilitating transmission of a sensory signal of direction information to an agent based on an interaction between the agent and a physical beacon, according to some aspects of the disclosed technology.

FIG. 16 illustrates a flowchart for an example method 1600 of facilitating transmission of a sensory signal of direction information to an agent based on interaction between the agent and a physical beacon, according to some aspects of the disclosed technology. The method 1600 shown in FIG. 16 is provided by way of example, as there are a variety of ways to carry out the method. Additionally, while the example method 1600 is illustrated with a particular order of steps, those of ordinary skill in the art will appreciate that FIG. 16 and the modules shown therein can be executed in any order and can include fewer or more modules than illustrated. Each module shown in FIG. 16 represents one or more steps, processes, methods or routines in the method 1600.

At step 1610, a collection location for an item that needs to be picked up by an agent can be determined. The item can be for a delivery, which needs to be picked up by an agent and transferred to a customer. In some examples, the item that needs to be picked up can be any merchandise, grocery items, or a food order. In other examples, the item can be a product in a warehouse or a storehouse. As follows, the collection location can be a grocery store, a restaurant, a warehouse, a store, or any business place for a merchant.

At step 1620, a physical beacon associated with the collection location can be identified. A physical beacon can include an applicable physical device for facilitating the transmission of signals to an agent for guiding the agent to the collection location. More specifically, the physical beacon can include a location beacon as described herein and as illustrated in FIGS. 1A-10. The physical beacon can be used in facilitating transmission of a sensory signal to an agent, as will be described in greater detail later. A sensory signal, as previously described with respect to FIG. 14, can include a signal that can be perceived by a human, e.g., the agent. Specifically, a sensory signal can include any type of signals, visual (e.g., lights) or audible (e.g., sirens, bells, etc.) that is perceivable by the agent while the agent is involved in a step associated with either or both collecting the item and transferring the item to the customer.

The physical beacon can be associated with the collection location based on a position of the beacon in relation to the collection location. Specifically, the physical beacon can be at the collection location. Further, the physical beacon can be in proximity to the collection location but not actually at the collection location. For example, the physical beacon can illuminate to indicate a direction of the physical location. Additionally, the physical beacon can be part of a plurality of physical beacons that are at the collection location or in proximity to the physical location. The plurality of physical beacons can form a trail to or towards the collection location. For example, as illustrated in FIG. 12, the physical beacon can be an aisle marker to guide the agent to a general area of where the item for collection is located.

In other example, as illustrated in FIG. 12, the physical beacon can be a shelf marker where the item is placed to guide the agent to the collection location for the item.

In some implementations, the physical beacon can be associated with one or more items with an identical SKU. For example, in a warehouse setting, the physical beacon can be more specifically associated with a specific SKU so that an agent can locate the item with the corresponding SKU based on the direction information provided by the physical beacon. The physical beacon can be linked to SKU within a database that stores the product information such as SKUs.

In other implementations, the physical beacon can be associated with a plurality of items. The physical beacon can be used to indicate a general area where more than a single item is located. Further, the sensory signal can be specific to each of the plurality of items. For example, a different color can be used to indicate the item (e.g., red for Item A, yellow for Item B when Items A and B are located close enough, for example, on the same shelf that a single physical beacon is used to indicate their locations).

At step 1630, an interaction between the physical beacon and the agent can be detected. An interaction, as used herein, can include an event that occurs based on the physical beacon and the agent being in physical proximity to each other. Physical proximity, as previously described with respect to FIG. 14, can include the physical beacon and the agent being separated by a physical distance such that the physical beacon can be used to guide the agent to a specific location (e.g., a collection location). For example, the physical beacon and the agent can be close enough so that the agent can view the physical beacon as part of the physical beacon guiding the agent to a specific location. In another example, the physical beacon and the agent be close enough so that the physical beacon can trigger the transmission of a sensory signal through a device used by the agent.

An interaction between the physical beacon and the agent can be triggered based on a boundary that is defined with respect to the physical beacon (i.e., a geofence). Specifically, an interaction between the physical beacon and the agent can be initiated when the agent crosses a boundary surrounding the physical beacon, as illustrated in FIG. 10. While reference is made to the interaction occurring between the agent and the physical beacon, an interaction can actually occur between a device of the agent and the physical beacon. More specifically, an interaction can occur between the physical beacon and a device that is physically near the agent to serve as an accurate representation or approximation of the location of the agent. For example, a smart device in a car driven by the agent or that is carried by the agent can serve to trigger an interaction with the physical beacon.

At step 1640, transmission of a sensory signal to the agent is facilitated in response to the interaction between the physical beacon and the agent. As previously described, the sensory signal can provide perceivable direction information associated with the collection location to the agent. The direction information can include any applicable information that can be perceived by the agent to provide directions to the collection location, more specifically, to the collection location in relation to a location of the physical beacon.

In facilitating transmission of the sensory signal to the agent, the physical beacon itself can generate and transmit the sensory signal to the agent. The sensory signal can be generated and/or transmitted by the physical beacon in one or more applicable forms.

The sensory signal can be specific to one or more agents. In particular, the sensory signal can be specific to one or more agents based on the interaction between physical beacon(s) and the one or more agent. For example, a certain sensory signal can be generated specifically for the agent in response to the interaction between the physical beacon and the agent. In generating a sensory signal that is specific to an agent, characteristics of the sensory signal can be modified and correspond to the agent. For example, signals of certain colors can be displayed for specific agents. This is advantageous in areas with high densities of physical beacons and agents to reduce confusion amongst agents and provide for efficient item collection.

Further, a device in proximity to the agent and separate from the physical beacon can be controlled to generate and transmit the sensory signal to the agent. Specifically, instructions to generate a visual/audible representation of directions to the collection location can be sent to a smart device that is associated with the agent (e.g., viewable by the agent or sensed by the agent via a buzz, etc.). As follows, the smart device can generate the representation of the directions to the collection location to the agent. The physical beacon can be used in controlling the device that is in proximity to the agent to generate and transmit the sensory signal to the agent. For example, the physical beacon can transmit control instructions for generating the sensory signal to a smart phone in proximity to the agent. In controlling the device to generate and transmit the sensory signal, the physical beacon can either send the control instructions to the device over a LAN or a WAN as previously described with respect to FIG. 14. For example, the physical beacon can be connected to the device over a short range wireless connection and transmit the instructions to the device over the short range wireless connection. In another example, the physical beacon can be connected to the device over a WAN and transmit the instructions to the device through the internet.

The sensory signal can be generated and transmitted to the agent based on the location of the physical beacon in relation to the collection location. Specifically, variable characteristics of the sensory signal (e.g., colors, blinking, brightness, a combination of visual and audible signals, etc.) can be selected based on the location of the physical beacon in relation to the physical location. For example, the color of the physical beacon can be adjusted as an agent approaches the collection location. In another example, a specific color can be used to illuminate the physical beacon if the physical beacon is actually at the collection location. Likewise, a different color can be used to illuminate the physical beacon if the physical beacon is positioned away from the physical location, e.g. as part of a group of physical beacons that form a path towards the physical location.

Further, the physical beacon can be location aware. Specifically, the physical beacon can include hardware and/or software for identifying a position or location of the physical beacon, e.g. in relation to the collection location. As follows, the physical beacon can generate and transmit the sensory signal based on the self-identified location of the physical beacon as previously illustrated with respect to FIG. 14. Additionally, the physical beacon can transmit the sensory signal the entire time the agent is within the geofence. Once it is determined that the item has been picked up by the agent (e.g., via a confirmation signal), the physical beacon is triggered to be turned off or discontinues transmission of the sensory signal.

Figure 17:
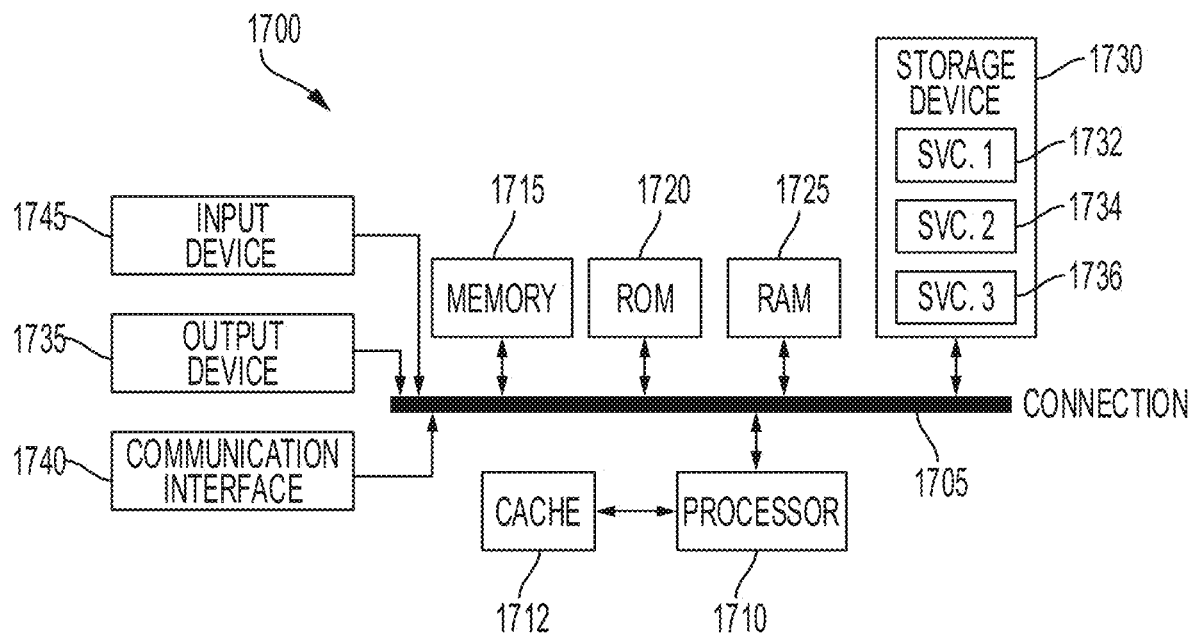
FIG. 17 illustrates an example processor-based system with which some aspects of the subject technology can be implemented.

The disclosure now turns to FIG. 17 which illustrates an example of a bus computing system 1700 wherein the components of the system are in electrical communication with each other using a bus 1705. The computing system 1700 can include a processing unit (CPU or processor) 1710 and a system bus 1705 that may couple various system components including the system memory 1715, such as read only memory (ROM) 1720 and random access memory (RAM) 1725, to the processor 1710. The computing system 1700 can include a cache 1712 of high-speed memory connected directly with, in close proximity to, or integrated as part of the processor 1710. The computing system 1700 can copy data from the memory 1715, ROM 1720, RAM 1725, and/or storage device 1730 to the cache 1712 for quick access by the processor 1710. In this way, the cache 1712 can provide a performance boost that avoids processor delays while waiting for data. These and other modules can control the processor 1710 to perform various actions. Other system memory 1715 may be available for use as well. The memory 1715 can include multiple different types of memory with different performance characteristics. The processor 1710 can include any general purpose processor and a hardware module or software module, such as module 1 1732, module 2 1734, and module 3 1736 stored in the storage device 1730, configured to control the processor 1710 as well as a special-purpose processor where software instructions are incorporated into the actual processor design. The processor 1710 may essentially be a completely self-contained computing system, containing multiple cores or processors, a bus, memory controller, cache, etc. A multi-core processor may be symmetric or asymmetric.

To enable user interaction with the computing system 1700, an input device 1745 can represent any number of input mechanisms, such as a microphone for speech, a touch-protected screen for gesture or graphical input, keyboard, mouse, motion input, speech and so forth. An output device 1735 can also be one or more of a number of output mechanisms known to those of skill in the art. In some instances, multimodal systems can enable a user to provide multiple types of input to communicate with the computing system 1700. The communications interface 1740 can govern and manage the user input and system output. There may be no restriction on operating on any particular hardware arrangement and therefore the basic features here may easily be substituted for improved hardware or firmware arrangements as they are developed.

The storage device 1730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1730 can include the software modules 1732, 1734, 1736 for controlling the processor 1710. Other hardware or software modules are contemplated. The storage device 1730 can be connected to the system bus 1705. In some embodiments, a hardware module that performs a particular function can include a software component stored in a computer-readable medium in connection with the necessary hardware components, such as the processor 1710, bus 1705, output device 1735, and so forth, to carry out the function. For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:
1. A method comprising:
  determining, by a processor, a physical location for transferring a delivery;
  identifying, by the processor, a physical beacon associated with the physical location;
  based on a geofence of the physical location being crossed by a device of a delivery person, detecting, by the physical beacon, an interaction between the physical beacon and the delivery person, the interaction occur- ring based on the physical beacon and the device of the delivery person being in physical proximity to each other; and upon the detecting the interaction when the geofence is crossed, facilitating, by the physical beacon, transmission of a sensory signal, wherein the physical beacon is included in a plurality of physical beacons that generate a plurality of sensory signals along a predetermined path toward the physical location and provide direction information toward the physical location.

2. The method of claim 1, wherein the direction information indicates that the physical beacon is at the physical location or provides a direction to the physical location in relation to the physical beacon.

3. The method of claim 1, wherein the sensory signal is specific to a customer for distinguishing the sensory signal from sensory signals that are specific to at least two different customers, respectively.

4. The method of claim 1, wherein the facilitating the transmission of the sensory signal further includes:
controlling the device of the delivery person to generate the sensory signal; and
transmitting the sensory signal from the device of the delivery person.

5. The method of claim 1, wherein the physical beacon is a location aware beacon thatand facilitates the transmission of the sensory signal based on a self-identified location.

6. The method of claim 1, further comprising:
associating the physical beacon with a customer based on an anticipated transfer of the item to the customer at the physical location; and
facilitating the transmission of the sensory signal based on both an association of the physical beacon with the customer and the interaction between the physical beacon and the device of the delivery person.

7. The method of claim 1, further comprising:
connecting the physical beacon to a network; and
associating the physical beacon with a client device of a customer through the network.

8. The method of claim 1, wherein the physical beacon is customer agnostic and is configured for use by different customers in receiving deliveries at the physical location.

9. A physical beacon comprising:
an interaction detector configured to detect an interaction between the physical beacon and a device of a delivery person, based on a geofence of a physical location for transferring an item being crossed by the device of the delivery person, the interaction occurring based on the physical beacon and the device of the delivery person being in physical proximity to each other; and
a signal controller that, upon the interaction being detected by the interaction detector when the geofence is crossed, facilitates transmission of a sensory signal,
wherein the physical beacon is included in a plurality of physical beacons that generate a plurality of sensory signals along a predetermined path toward the physical location and provide direction information toward the physical location.

10. The physical beacon of claim 9, wherein the direction information indicates that the physical beacon is at the physical location or provides a direction to the physical location in relation to the physical beacon.

11. The physical beacon of claim 9, wherein the physical beacon further includes a signal transmitter and the signal controller instructs the signal transmitter to:
generate the sensory signal; and
transmit the sensory signal.

12. The physical beacon of claim 9, wherein in, the transmission of the sensory signal, the signal controller causes the device of the delivery person to:
generate the sensory signal; and
transmit the sensory signal from the device.

13. The physical beacon of claim 9, wherein the physical beacon is a location aware beacon, and the signal controller facilitates the transmission of the sensory signal to the device of the delivery person based on a self-identified location of the physical beacon.

14. The physical beacon of claim 9, wherein the physical beacon is associated with a customer based on an anticipated transfer of the item to the customer at the physical location, and
the signal controller facilitates the transmission of the sensory signal based on both an association of the physical beacon with the customer and the interaction between the physical beacon and the device of the delivery person.

15. The physical beacon of claim 9, wherein the physical beacon further comprises a network interface for connecting the physical beacon to a network and the physical beacon is associated with a client device of athe customer through the network.

16. The physical beacon of claim 9, wherein the physical beacon is customer agnostic and is configured for use by different customers in receiving deliveries at the physical location.

17. A system comprising:
one or more processors; and
a computer-readable medium comprising instructions stored therein, which when executed by the one or more processors, cause the one or more processors to:
determine a physical location for transferring a delivery,
identify a physical beacon associated with the physical location,
based on a geofence of the physical location being crossed by a device of a delivery person, detect, by the physical beacon and, an interaction of the physical beacon with the device of the delivery person, the interaction occurring based on the physical beacon and the device of the delivery person being in physical proximity to each other, and
upon the detecting the interaction when the geofence is crossed, facilitate, by the physical beacon, transmission of a sensory signal,
wherein the physical beacon is included in a plurality of physical beacons that generate a plurality of sensory signals along a predetermined path toward the physical location and provide direction information toward the physical location.

\* \* \* \* \*